US011137610B1

United States Patent
Kessler et al.

(10) Patent No.: US 11,137,610 B1
(45) Date of Patent: Oct. 5, 2021

(54) SYSTEM, METHOD, AND NON-TRANSITORY COMPUTER-READABLE STORAGE MEDIA RELATED WEARABLE PUPIL-FORMING DISPLAY APPARATUS WITH VARIABLE OPACITY AND DYNAMIC FOCAL LENGTH ADJUSTMENT

(71) Applicant: Raytrx, LLC, Tulsa, OK (US)

(72) Inventors: David Kessler, Rochester, NY (US); Michael H. Freeman, Tulsa, OK (US); Jordan Boss, Tulsa, OK (US); Mitchael C. Freeman, Tulsa, OK (US); Steven Yeager, Tulsa, OK (US)

(73) Assignee: Raytrx, LLC, Tulsa, OK (US)

( * ) Notice: Subject to any disclaimer, the term of this patent is extended or adjusted under 35 U.S.C. 154(b) by 0 days.

(21) Appl. No.: 17/133,912

(22) Filed: Dec. 24, 2020

(51) Int. Cl.
G02B 27/01 (2006.01)
H04N 9/31 (2006.01)
G02B 27/00 (2006.01)

(52) U.S. Cl.
CPC ....... *G02B 27/0172* (2013.01); *H04N 9/3138* (2013.01); *G02B 27/0093* (2013.01); *G02B 2027/013* (2013.01); *G02B 2027/0118* (2013.01); *G02B 2027/0178* (2013.01)

(58) Field of Classification Search
CPC .............. G02B 27/017; G02B 27/0172; G02B 27/0093; H04N 9/3138
See application file for complete search history.

(56) References Cited

U.S. PATENT DOCUMENTS

| 6,023,253 | A  | * | 2/2000 | Taniguchi | G02B 27/0172 345/7 |
| 6,084,715 | A  | * | 7/2000 | Aoki | G02B 13/007 359/627 |
| 2010/0109980 | A1 | * | 5/2010 | Tohara | G02B 27/0172 345/32 |
| 2015/0362728 | A1 | * | 12/2015 | Tei | G02B 5/3033 353/20 |

(Continued)

OTHER PUBLICATIONS

Co-Pending utility U.S. Appl. No. 17/138,240 by David Kessler et al. entitled "Wearable Pupil-forming Display Apparatus" filed Dec. 30, 2020.

(Continued)

*Primary Examiner* — Alexander Eisen
*Assistant Examiner* — Cory A Almeida
(74) *Attorney, Agent, or Firm* — Louis S. Horvath

(57) ABSTRACT

A wearable display apparatus has an image generator that is energizable to form a 2D image; a partially transmissive mirror having a curved reflective surface; a beam splitter disposed to reflect light toward the curved mirror surface; and an optical image relay that is configured to relay the formed 2D image at the image generator to a curved focal surface of the partially transmissive mirror, wherein the curved focal surface is defined between the curved reflective surface of the partially transmissive mirror and the beam splitter, wherein the relay, curved mirror, and beam splitter are configured to form an exit pupil for viewing the generated 2D image as an optical virtual image; and a spatial light modulator configured with addressable array of pixels for selectively changing opacity for visible light from the object field according to dimensions of the generated 2D image.

22 Claims, 23 Drawing Sheets

(56) References Cited

U.S. PATENT DOCUMENTS

| | | | | |
|---|---|---|---|---|
| 2016/0286210 A1* | 9/2016 | Border | ................ | H04N 9/3185 |
| 2018/0003977 A1* | 1/2018 | Mir | .................... | G02B 27/0176 |
| 2018/0045955 A1* | 2/2018 | Alexander | ........... | H04N 9/3129 |
| 2018/0292654 A1* | 10/2018 | Wall | .................. | G02B 27/0081 |
| 2018/0348529 A1* | 12/2018 | Blum | .................. | H01L 27/3225 |
| 2019/0018236 A1* | 1/2019 | Perreault | ................. | G06F 3/013 |
| 2019/0339528 A1* | 11/2019 | Freeman | ................ | G09G 3/002 |
| 2020/0111259 A1* | 4/2020 | Sears | ..................... | G06F 3/012 |

OTHER PUBLICATIONS

Co-Pending utility U.S. Appl. No. 17/139,167 by David Kessler et al. entitled "Wearable Pupil-forming Display Apparatus" filed Dec. 31, 2020.

\* cited by examiner

SYSTEM, METHOD, AND NON-TRANSITORY COMPUTER-READABLE STORAGE MEDIA RELATED WEARABLE PUPIL-FORMING DISPLAY APPARATUS WITH VARIABLE OPACITY AND DYNAMIC FOCAL LENGTH ADJUSTMENT

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file, or records, but reserves all copyrights whatsoever in the subject matter presented herein.

FIELD OF THE DISCLOSURE

The present disclosure generally relates to wearable display apparatus and more particularly to a wearable display device that provides augmented reality (AR) viewing with a catadioptric pupil-forming optical system that renders a virtual image from a two-dimensional (2D) display, with variable opacity Dynamic Opacity™ and dynamically adjustable focal length.

BACKGROUND

Virtual image display has advantages for augmented reality (AR) presentation, including providing the capability for display of image content using a compact optical system that can be mounted on eyeglasses or goggles, generally positioned very close to the eye and allowing see-through vision, not obstructing the view of the outside world. Among virtual image display solutions for AR viewing are catadioptric optics that employ a partially transmissive curved mirror for directing image-bearing light to the viewer's eye and a partially reflective beam splitter for combining light generated at a 2D display with the real-world visible scene.

Vision correction applications have employed wearable display devices in order to enhance or compensate for loss of vision over portions of a subject's field of view (FOV). Additionally, physicians, surgeons, and other professionals and technicians using wearable AR displays need adjustable focal length, a method to offset ambient light, and a large pupil area. Support for these types of applications can require additional components and can introduce various factors related to wearability and usability that contribute to the overall complexity of the optical design and packaging.

The goal of the AR headset is to offer realistic, clear images that can simulate, overlay, or reconstruct the surrounding environment without making a user's eyes weary or cause the user discomfort such as queasiness. Among challenges that must be addressed with wearable AR devices is having a large "pupil", meaning a large "eye-box" or wider angles from which the virtual display may be seen clearly; obtaining sufficient brightness of the virtual image so that it may be seen in high ambient lighting conditions and sunlight; and ability to adjust the focal length of the virtual image to match a user's actual view of real-reality (RR).

There are two types of AR visualization methods, one uses a pupil expansion method, which is to create multiple pupil images through diffraction. Another method, taught here, is a pupil forming display system. The advantage of the pupil forming method, is that most types of AR systems, particularly those using pupil expansion, have reduced optical efficiency, manufacturing difficulties, and have issues with color dispersion causing chromatic aberrations. These systems are typically "wave-guide" technologies, which are susceptible to degradation in bright lighting conditions.

Measured in NITS or candelas per square meter ($Cd/m^2$), brightness for the augmented imaging channel must be sufficient for visibility under some demanding conditions, such as visible when overlaid against a bright outdoor scene. Other optical shortcomings of typical AR non-pupil forming displays include vulnerability to errant light rays, distortion, and angular field-of-view (FOV) constraints, typically limiting those AR displays to less than 50 degrees horizontal FOV. Further, solutions employing pupil expansion as a technique for enlarging the viewer eye-box tend to overfill the viewer pupil which wastes light, providing reduced brightness, compromised resolution, and lower overall image quality.

Challenging physical and dimensional constraints with wearable AR apparatus include limiting onboard component size and positioning and, with many types of optical systems, the practical requirement for folding the optical path in order that the imaging system components be ergonomically disposed, unobtrusive, and aesthetically acceptable in appearance. Among aesthetic aspects, compactness is desirable, with larger horizontal than vertical dimensions in the optical engine.

Other practical considerations relate to positioning of the display components themselves. Any number of displays may be used to generate the images, including Organic Light-Emitting Diode (OLED) displays, Light Emitting Diode (LED) displays, and back-lit Liquid Crystal on Silicon (LCOS) displays. Each of these use emissive technologies; alternatively, projection displays may be used. Each of these has a number of advantages and disadvantages. For brightness and overall image quality, OLED devices seem currently the most promising, with LEDs gaining ground. However, each of these devices can generate perceptible amounts of heat during operation. For this reason, it is advisable to provide some distance or air space between a display and the skin, particularly since it may be necessary to dispose these devices near the viewer's forehead and temples.

While there have been a number of advances in performance and usability of head-mounted displays (HMDs) providing AR viewing, existing systems and proposed solutions fall short of what is needed in at least two areas:
  (i) Compensation for ambient brightness. One inherent problem with AR HMDs, widely acknowledged among those skilled in the display art, relates to achieving a suitable balance between visibility of the real-world object scene content and of the electronically generated and displayed image content. With conventional AR systems, visibility of the electronically generated image, under bright-light ambient conditions, can be very poor. It can be difficult, for example, to make the generated electronic image distinct enough to be clearly visible against a real-world visible scene that is bathed in intense sunlight. Even at the highest achieved brightness levels for electronic image formation with AR devices, the generated images typically have a "washed out" appearance and can be difficult to perceive when formed against bright sunlight and in similar high-brightness ambient conditions.
    One solution that has been implemented is simply attenuating or even blocking the ambient light from the HMD field of view, so that the electronically generated image can be more visible. This type of solution may be appropriate for a limited range of situations. However, such a solution is inflexible and can adversely affect viewer visibility and safety, along with other undesirable side effects. In practice, such a solution clearly defeats the very purpose of the AR system, compromising visibility of the real-world scene in order to render the generated image more visible, and, in extreme cases, effectively providing a reduced-visibility virtual reality (VR) viewer that obscures the external scene rather than a fully-fledged AR display that superimposes electronic content upon or against the external scene.

Another solution that has shown limited success is simply increasing brightness of the generated image. However, this approach has some significant drawbacks for the viewer. A brighter generated image means increased contraction of the pupil, effectively reducing the amount of light entering the eye onto the retina. As brightness further increases, retinal damage is a clear possibility. Where an excessive number of Nits are projected into the eye, there is the potential not only for "ghosting" on the retina, but also for retinal pain and damage.

(ii) Streamlined packaging and appearance. Yet another disappointing aspect of many HMD solutions for AR relates to packaging and overall appearance. For widespread acceptance, any practical AR solution must be compact, lightweight, and streamlined in appearance, neither encumbering the wearer, nor making the wearer feel conspicuous in a public setting. At the same time, the HMD device can benefit the viewer significantly when provided with a range of supporting sensor, communications, and ancillary display devices.

The advantages of AR operation make the HMD potentially useful for a range of functions, well beyond those of conventional VR and other display modalities. These include various applications in medical, industrial, safety, military, and other fields, for example. Considering the potential advantages afforded by well-designed AR HMDs, it can be readily appreciated that there is a need for improved brightness compensation as well as for packaging solutions that allow relatively seamless integration of various types of sensors, input/output devices, and other components.

It has proved challenging to wearable display designers to provide the needed image quality, while at the same time allowing the wearable display device to be comfortable and aesthetically pleasing and to allow see-through visibility. In addition, the design of system optics must allow wearer comfort in social situations, without awkward appearance that might discourage use in public. Packaging requirements for wearable eyeglass display devices can be quite demanding and can make some compromises necessary. As noted previously, in order to meet ergonomic and other practical requirements, some folding of the optical path along one or both vertical and horizontal axes may be desirable.

SUMMARY OF THE INVENTION

The Applicants address the problem of advancing the art of AR display and addressing shortcomings of other proposed solutions, as outlined previously in the background section.

The Applicants' solution uses pupil forming and can be distinguished from pupil expansion systems known to those skilled in the art. By comparison with pupil expansion approaches, the Applicants' approach yields a more efficient optical system with improved image quality, compatible with a variety of suitably sized display generators, such as various micro-displays and flat-panel displays described, but not limited to, those mentioned herein. Moreover, the eyes of the viewer can clearly see and be seen by others, with minimal impediment from the optics that provide the electronically generated virtual image.

Wearable display apparatus of the present disclosure is well-adapted for systems that complement viewer capabilities, such as where a viewer may have visual constraints due to macular degeneration or other condition of the eyes.

With these objects in mind, there is provided a wearable display apparatus comprising:

(a) an image generator that is energizable to form a 2D image;

(b) a partially transmissive mirror having a curved reflective surface;

(c) a beam splitter disposed to reflect light toward the curved mirror surface;

(d) an optical image relay that is configured to relay the formed 2D image at the image generator to a curved focal surface of the partially transmissive mirror, wherein the curved focal surface is defined between the curved reflective surface of the partially transmissive mirror and the beam splitter, wherein the relay, curved mirror, and beam splitter are configured to form an exit pupil for viewing the generated 2D image as an optical virtual image;

and (e) a spatial light modulator configured with addressable array of pixels for selectively changing opacity for visible light from the object field according to dimensions of the generated 2D image.

DRAWINGS

DETAILED DESCRIPTION

Figure 1B:
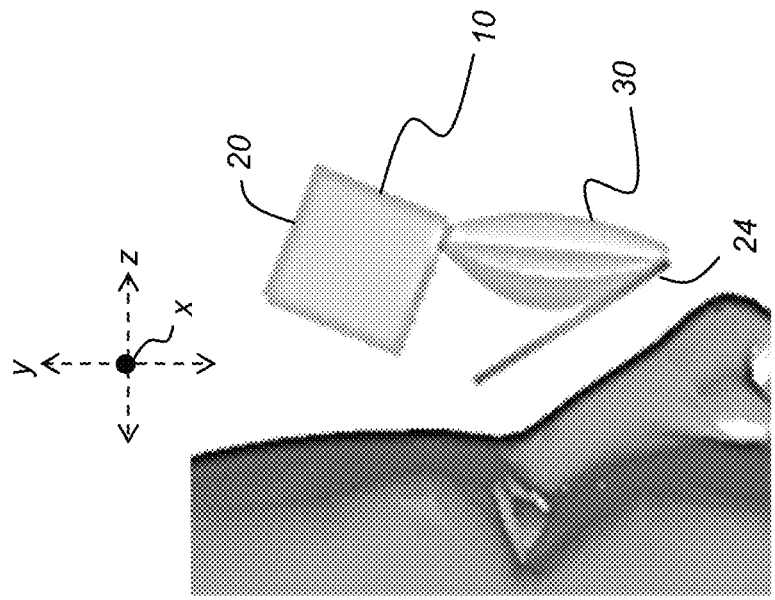
FIG. 1B is a schematic side view showing placement of optical components of the system.

The following is a detailed description of the preferred embodiments of the disclosure, reference being made to the drawings in which the same reference numerals identify the same elements of structure in each of the several figures.

Where they are used, the terms "first", "second", and so on, do not necessarily denote any ordinal, sequential, or priority relation, but are simply used to more clearly distinguish one element or set of elements from another, unless specified otherwise.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification. It will be apparent to one having ordinary skill in the art that the specific detail need not be employed to practice according to the present disclosure. In other instances, well-known materials or methods have not been described in detail in order to avoid obscuring the present disclosure.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

In the context of the present disclosure, the term "coupled" is intended to indicate a mechanical association, connection, relation, or linking, between two or more components, such that the disposition of one component affects the spatial disposition of a component to which it is coupled.

For mechanical coupling, two components need not be in direct contact, but can be linked through one or more intermediary components.

With particular respect to electronic signal content, several (or different) elements discussed herein and/or claimed are described as being "coupled," "in communication with," "integrated," or "configured to be in signal communication with" or a "system" or "subsystem" thereof. This terminology is intended to be non-limiting and, where appropriate, can be interpreted to include, without limitation, wired and wireless communication using any one or a plurality of a suitable protocols, as well as communication methods that are constantly maintained, are made on a periodic basis, and/or made or initiated on an as-needed basis.

In the context of the present embodiment, the "generated image" also termed "electronic image" is the image that is formed by system electronics of the HMD. As optically generated, this image appears to the viewer as a virtual image in embodiments described herein. The generated, virtual image appears superimposed on the object scene that is otherwise visible and appears as "real-world" content.

In conventional optical parlance, a virtual image (VI) can be distinguished from a real world (RR) image. A real image is formed where rays corresponding to an object point converge to a corresponding image point, focusing typically on a screen or other diffusive surface. A virtual image, on the other hand, is formed by light rays that emerge from an optical device (lens, mirror, or some combination) relative to perceived or apparent origins of ray divergence. In diagrams of optical systems, virtual rays are conventionally represented by dotted lines.

Because the rays that form an optical virtual image never actually converge, a real image is not formed; the virtual image employs the optics of the eye itself and cannot be projected onto a screen. Optical virtual images are located by tracing the real rays that emerge from an optical device (lens, mirror, or some combination) backward to a perceived point of origin.

As may be used herein, "dexel" means "detector element" which is the analog of a pixel ("picture element") but native to a detector rather than a visible picture. This means that the dexel relates to a conversion equation, scaling, or oversampling of the pixels in the reflective layer. That is, it describes the elements in a detector, which may be processed, combined, resampled, or otherwise modified or manipulated before creating an image or picture. As such, there may or may not be a one-to-one correspondence between the pixels in an image and the dexels used to create an image. With respect to the optical system, the dexel corresponds to a pixel at a designated depth. A dexel may also relate to an image or display which may be either real or virtual created by the convergence of two displays. For example, cameras labeled as "10-megapixel" can be used to create a 640×480 picture. Using dexel terminology, the camera actually uses 10 million dexels to create a picture with 640×480 pixels. A pixel can also be used to describe the mechanism for manipulating the pixels in a virtual display or reflective layer.

Dexel is also is used to mean "depth pixel" which is a concept used for a discretized representation of functions defined on surfaces used in 3D modeling or geometrical modeling and physical simulation, sometimes also referred to as multilevel Z-map. With relation to the present disclosure, references to a pixel can also relate to its integral dexel and vice-versa. Pixels can be assigned dexel information by the controller to obtain perspective coordinates, so that not only do they possess x,y coordinate information (for 2-dimensional viewing), but they also include added z coordinate information (for 3D viewing). Alternatively, a method may laterally shift corresponding pixels from display images to the aligned and interpupillary distance-adjusted viewing axis of both eyes in order to relay perceived depth of the images to the human eyes and brain. This is accomplished by algorithms which position the pixels in different corresponding dexel depth sufficient for the eyes to recognize the image as a 3-dimensional image derived from two-dimensional information. Additionally, using epipolar geometry, combined with eye-tracking and focus adjustment, one can keep the 3D image in suitable focus when viewed at a far or close distance. Thus, dynamic focus may be used to manipulate the position of microdisplays to be closer or farther away from the next optical element, with a device like a piezoelectric actuator or motor, to solve for vergence accommodation conflict by matching the location of the perceived virtual image, as indicated by the parallax conditions generated by the solution of the epipolar image generation.

It is generally held that the human observer has eight depth cues; these are used by the brain to estimate the relative distance of either or both of the virtual or real-world object. These depth cues are focus, perspective, occlusion, light and shading, color intensity and contrast, relative movement, vergence, and stereopsis.

The piezoelectric actuator motor, or simply, piezoelectric actuator, is a type of electric actuator that provides displacement or movement based on the change in shape of a piezoelectric material in response to an applied electrical field. The electric field is adequate for the purposes of rapidly moving the display in this invention. When the controller analyses the information from susbsystems like the eye-tracking subsystem, ambient light sensors, head-movement sensing, movement of the images viewed, or artificial intelligence, the controller generates signals indicative of depth cues. In response to these depth cue signals, the piezoelectric motor can be pulsed to cause movement, such as a displacement that changes the image plane of the optical engine depicted herein. As a continuous subsystem, a piezoelectric actuator can dynamically control the image plane and thus, vary the focus of the images formed for viewing by a user. The controller manipulates the piezoelectric actuator in accordance with the depth mapping information from the sensor systems. In this fashion, the epipolar geometry in combination with the piezoelectric actuator motor movement of the display can be used to resolve vergence/accommodation conflict.

Alternatively, instead of using a piezoelectric actuator motor, 3D imaging can be created by a light-field display, where the display uses one or more methods to create a field that contains both positional and angular ray presentations. Using algorithms the display can create a light-field where the perceived depth of an image matches the parallax seen by the viewer's eyes. In other words, a 3D image may be created as an interactive floating 3D light-field display where the physiological depth cues are generated by directing light rays with a microlens array, diffractive array, or other techniques. The physiological depth cues are accommodation, convergence, binocular parallax, and monocular movement parallax. Convergence and binocular parallax are the only binocular depth cues; others are monocular.

Some portions of embodiments in accordance with the present invention may be embodied as a system, an apparatus, a method, a computer program, hardware/software, and/or product, including encoded instructions on a transitory or non-transitory computer-readable storage medium. All of the systems and subsystems may exist, or portions of the systems and subsystems may exist to form the invention. Accordingly, the present invention may take the form of an entirely hardware embodiment, an entirely software embodiment (including firmware, resident software, micro-code, etc.), or an embodiment combining software and hardware aspects that may all generally be referred to herein as a "unit," "module," or "system." Furthermore, the present invention may take the form of a computer program product embodied in any tangible media of expression having computer-usable program code embodied in the media. Any combination of one or more computer-usable or computer-readable media (or medium) may be utilized. For example, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. Further, the intelligence in the main logic circuitry may be software, firmware, or hardware, and can be microcontroller based or included in a state machine. The invention may be a combination of the above intelligence and memory and this can exist in a central processing unit or a multiple of chips including a central graphics chip. The computer portion of the invention may also include a model view controller (MVC) which is also called herein a "model controller", or "controller".

An embodiment of the present disclosure provides AR viewing and display having a large FOV with an optical system having an optical path that folds in the horizontal or x-direction, the direction substantially parallel to a line between left and right pupils of a viewer, for forming an intermediate image to the curved mirror. An embodiment of the AR system of the present disclosure has a component arrangement as shown schematically in the front view of FIG. 1A and from the side in FIG. 1B. The corresponding light path is shown schematically in FIGS. 2A and 2B, respectively. A flat-panel display is energized as an image generator 10 to form an image and to direct image-bearing light through beam-shaping optics and to a folding prism 20 that redirects the image-bearing light towards a combiner that has a beam splitter 24 and a curved mirror 30 for forming the virtual image from electronically generated image content. Image generator display 10 can be a display that emits modulated light, such as an organic light-emitting device (OLED) array, a micro-LED array, or other type of electroluminescent array or a liquid crystal array or other type of light modulator having a supporting light source. Display 10 can further have accompanying lenslets for shaping the modulated light.

In order to address the need for improved overall imaging performance, wider FOV, compactness, and other factors outlined previously in the background, embodiments of the present disclosure have a number of features shown particularly in FIGS. 3A, 3B, 4A, 4B, and 4C. Specific features of interest include:

(i) relay of the image generator 10 to form a curved intermediate image I. Intermediate image I is formed along the focal surface of curved mirror 30, with the approximate position shown by a dashed line in FIG. 5. An optical relay 40, with particular structure as described in more detail subsequently, translates the image formed from image generator 10 to the curved intermediate image I along the focal surface.

(ii) use of a cylindrically curved quarter-wave plate (QWP) in the combiner optics, between mirror 30 and beam splitter 24. Curvature of this element helps to minimize variations in retardation that can be caused by the QWP over the FOV.

(iii) large exit pupil 44. System optics can form a 10 mm exit pupil at the viewer's eye-box for eye E. Forming a suitably sized pupil for the viewer helps to provide an eye-box of reasonable dimensions to allow eye movement, without noticeable vignetting. The apparatus does not need to provide pupil expansion, such as is used in existing wearable display apparatus that reduce the brightness of the displayed image and can also introduce artifacts into the see-through channel. Rather, the disclosed system uses pupil-forming optics for improved efficiency and brightness, as well as for improved image resolution and unhindered visibility of the object scene.

Significantly, the eyes of the viewer can clearly see and be seen by others, with minimal impediment from the beam splitter and curved mirror optics that provide the electronically generated virtual image.

With the optical arrangement shown, the aperture stop lies within prism 20 of the image relay, along or very near the fold surface that is provided on prism 20.

The given design allows an FOV along the horizontal (x) axis of greater than 50 degrees. The FOV aspect ratio (horizontal:vertical) equals or exceeds 1.5. Digital correction is not needed for distortion or lateral color.

According to an embodiment, curved mirror 30 has a conic surface shape. The conic shape is advantaged, in the embodiment shown herein, helping to control chief ray angles, thus correcting for distortion.

Figure 4A:
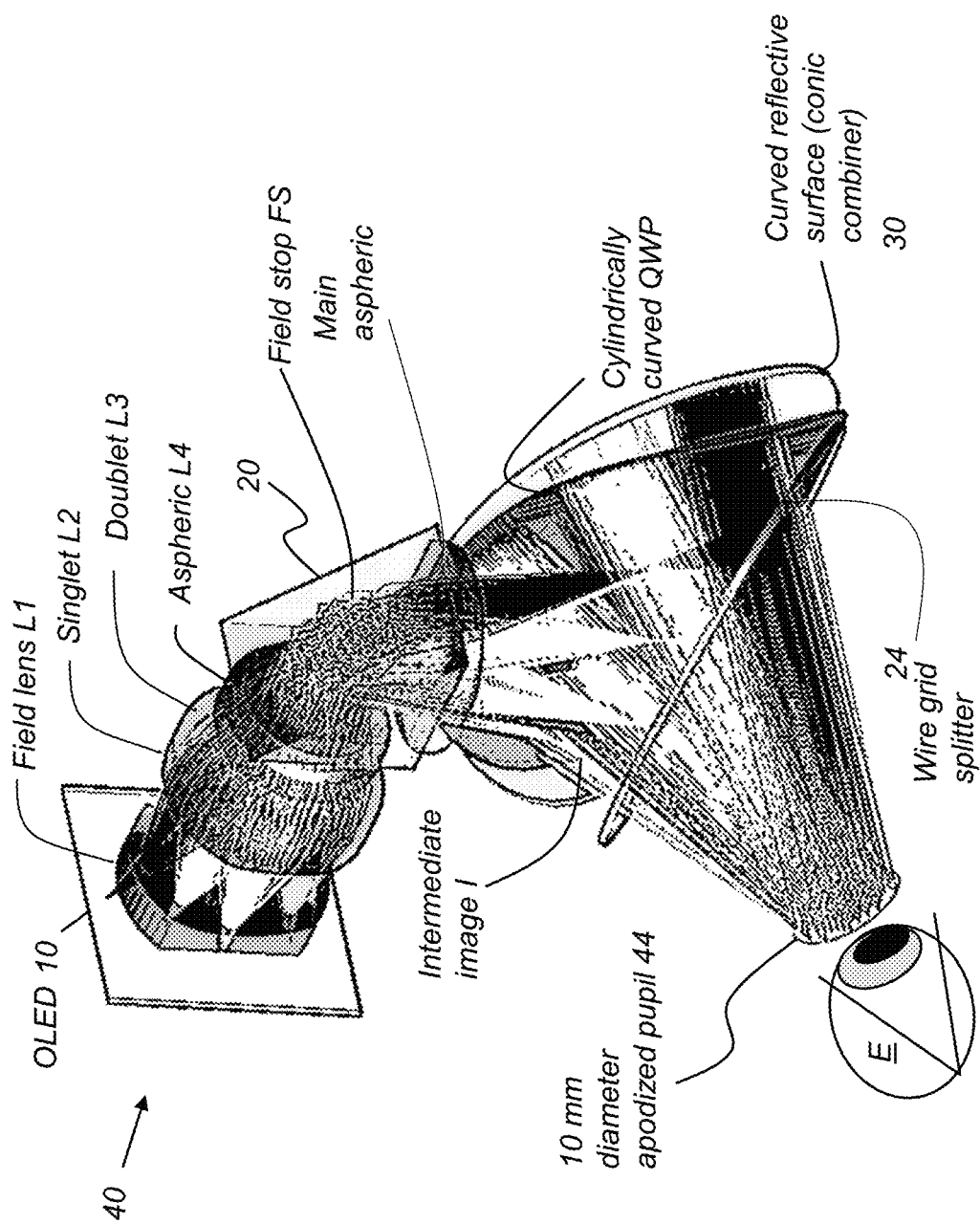
FIG. 4A is a schematic that shows, from an alternate perspective view, components of an optical apparatus for AR viewing.

Depending on whether or not polarization is used for configuring light paths, beam splitter 24 can be either a polarization-neutral beam splitter or a polarization beam splitter. Beam splitter 24 can be, for example, a wire grid polarization beam splitter as shown in FIG. 4A.

Brightness Compensation (Optional)

Figure 4B:
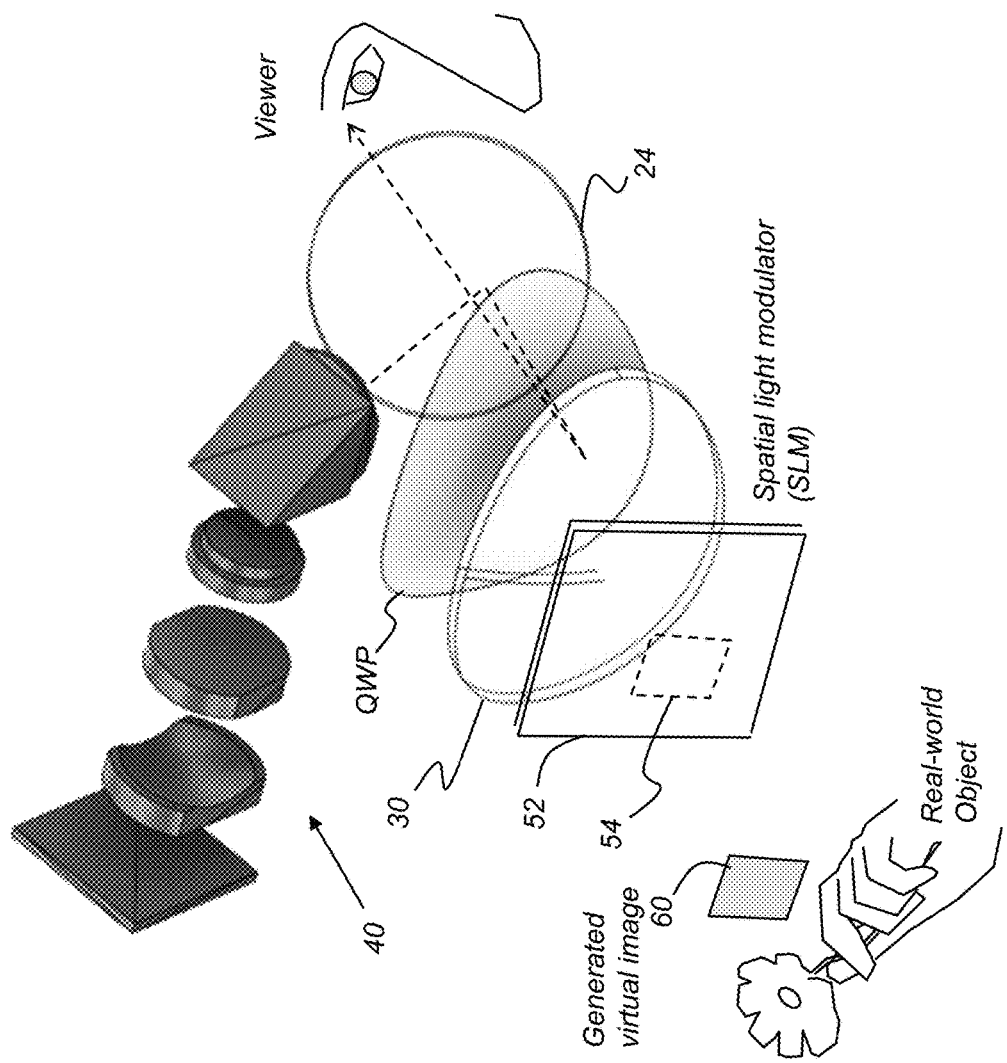
FIG. 4B is a perspective diagram showing optical system components, including an optional spatial light modulator for brightness compensation.
Figure 4C:
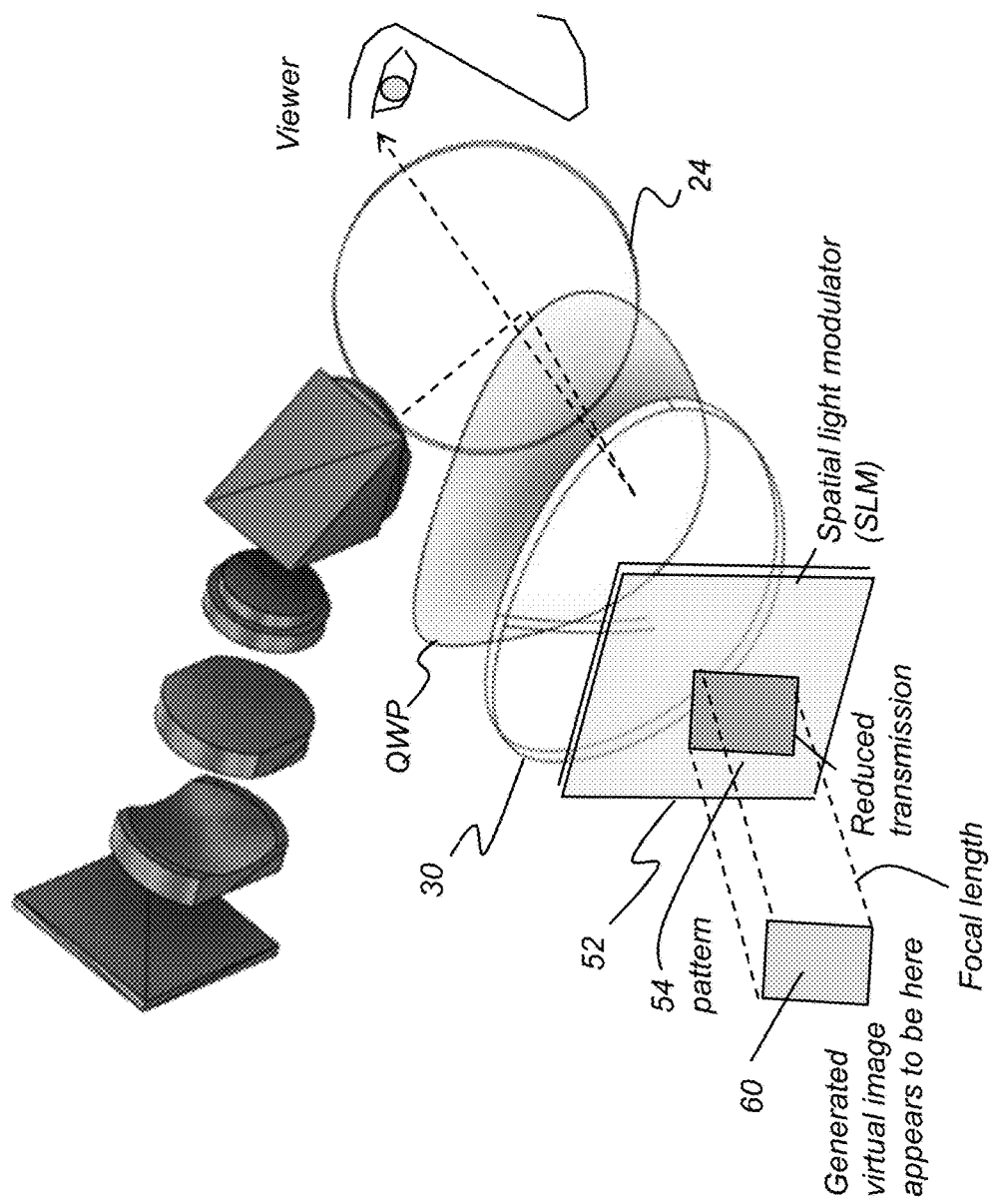
FIG. 4C is a schematic diagram that shows features for compensating for high brightness in the field of view.

According to an alternate embodiment, as shown schematically in FIGS. 4B and 4C, polarization or other method for conditioning the transmission of light can be used within the combiner optics in order to provide a measure of correction to compensate for high ambient brightness. An additional optical element, such as a polarizer or an added optical treatment, such as a coating, can be provided in the optical path, such as disposed between combiner optics and the eye.

In the example of FIG. 4B, the image-bearing light from the OLED emitter can be polarized and thus pass through the relay optics having a first linear polarization. Beam splitter 24 is a polarization beam splitter configured to reflect the first polarization and transmit light of the alternative second polarization state. The reflected light is directed toward curved mirror 30 and returns, after two passes through the QWP, in the second polarization state.

It is useful to remember that the virtual image 60, shown as if floating in space in the FIGS. 4B and 4C representation, is not actually formed by light at the spatial position shown. The virtual image is generated by the optical system comprising relay 40 and supporting mirror, QWP, and beam splitter components, and does not utilize light from the visual field for forming an image therein. For the viewer, the generated virtual image appears to be superimposed onto the real-world object scene. Thus, as represented in FIG. 4B, the generated virtual image 60 appears to be in the visual field of the viewer, along with, or superimposed upon, one or more real-world objects, as shown. But the actual path of the light that forms the virtual image 60 along the viewer line of sight does not extend beyond curved mirror 30. This is unlike light from the real-world object scene, which enters the line of sight from real-world objects beyond curved mirror 30. Moreover, the apparent dimensions and spatial location of the generated virtual image are determined by the size of the original generated 2D image from image generator 10 and also by angles of light directed toward the viewer's eye by the optical system.

Conflict particularly occurs when bright light from the real-world object scene is overpowering and competes with viewer perception of the virtual image 60. When this brightness conflict occurs, significant loss of contrast can result; the generated image 60 can be too difficult to see and can be effectively lost to the viewer. Thus, as shown schematically in FIG. 4C, to improve visibility of the virtual image that is formed, it can be useful to block or mask at least some of the light from the real-world object scene, at least over the area, shown as a pattern 54, that corresponds to the apparent location of generated virtual image 60.

Although, under high brightness conditions, it can be desirable to reduce the intensity of incident light from the real-world field of view in order to allow better visibility of the generated virtual image 60 content, attempts at globally reducing all of the external light that is directed to the eyebox provide a poor solution. Globally darkening a lens can even be hazardous, possibly preventing the viewer from clearly seeing real-world objects in the field of view.

FIGS. 4B and 4C show an approach for resolving the brightness conflict using a pixel-addressable spatial light modulator (SLM), disposed along the viewer line of sight, as part of the optical apparatus using relay 40 and its associated components. SLM 52 is a pixellated optical component having a surface that is energizable to exhibit variable levels of transparency or attenuation to light at addressed pixel positions along its surface. Light attenuation at each individual pixel can be effected by controlling light transmission in some way. Methods for varying light attenuation can modulate pixel transmission characteristics such as changing polarization state, for example, or by darkening the pixel to absorb a variable amount of light, or by causing the pixel to have increased reflectance and decreased transmittance.

In whatever manner localized light attenuation is provided, the SLM 52 can provide brightness compensation by forming a brightness compensation pattern 54 (FIGS. 4B, 4C) that serves to mask some or all of the surrounding light, as well as to mask bright light sources that tend to interfere with visibility of the generated virtual image content. This masking can be a shading of a portion of the field, such as shading the top or either or both edge portions of the lens or curved mirror, depending on the position of the viewer and direction of the external light source. Position data can be preset in processing logic circuitry so that shading is actuated upon detection of excessive brightness at some angle and from some location in the visible field. For example, in mid-day sun, it can be useful to shade more towards upper portions of the optical system than towards center portions; similarly, when the viewer is driving, bright sunlight on the left side can cause corresponding shading on the left, rather than on the right.

In an embodiment of the present disclosure, the SLM 52 can be controlled to vary light transmission through the surface or through different portions of its surface, so that light from the visible object scene is attenuated, while light forming the virtual image, having a predetermined polarization state, is not attenuated.

According to an alternate embodiment, SLM 52 is not a separate component as shown in FIG. 4B, but can be formed on or within curved mirror 30, such as being formed on surface layers of mirror 30.

Unconditioned light from the real-world object scene is not polarized. The field of view is visible through mirror 30, the QWP, and polarization beam splitter 24, as shown in FIG. 4B.

According to an embodiment, SLM 52 can act as a polarizer, dynamically changing the polarization state of each addressable pixel along the surface so that light of one polarization state from the field of view is highly attenuated. This attenuated state has a polarization axis orthogonal to the polarization axis of the virtual image. Thus, a portion of the light incident from the FOV is attenuated, but the virtual image is at full intensity.

An optional polarization treatment or coating can be used to polarize light from the object scene. Thus, for example, the exterior convex surface of curved mirror 30 can have a polarizer or be otherwise conditioned to polarize incoming light from the object scene.

Using the model provided by FIG. 4B, the schematic diagram of FIG. 4C shows an example for reducing the visibility of the object scene in an addressable manner, in order to enhance the visibility of the generated image. A generated virtual image, shown as rectangular in this schematic, is formed, appearing to be in space at some distance from the viewer and superimposed onto the visible scene. SLM 52 is controlled to change polarization, or other optical characteristic over a local region, as shown, so that transmission of light from the object scene is reduced over a portion of the FOV. The brightness reduction can depend on polarizers in the path of the incoming light and shifting of the polarization axis within addressable pixel areas of SLM 52. Using the arrangement of FIG. 4C, the generated virtual image 60 can thus appear at full brightness when viewed within in the area corresponding to a pattern 54 where the object scene content has correspondingly reduced brightness.

Depending on the type of device that is used, SLM 52 can alternately provide a form of localized masking for the display. In order to provide localized masking, SLM 52 operation would require signal communication with the logic processor that also controls the OLED or other image generator display 10.

SLM 52 can be a liquid crystal array, for example, or some other device with variable transmittance and thus suitable for controlling incident light intensity. In practice, any suitable type of material having controllable opacity can be employed, added to a suitable surface in the optical system to block some or all of the light from the object scene and allow the virtual image to be formed.

Figure 4D:
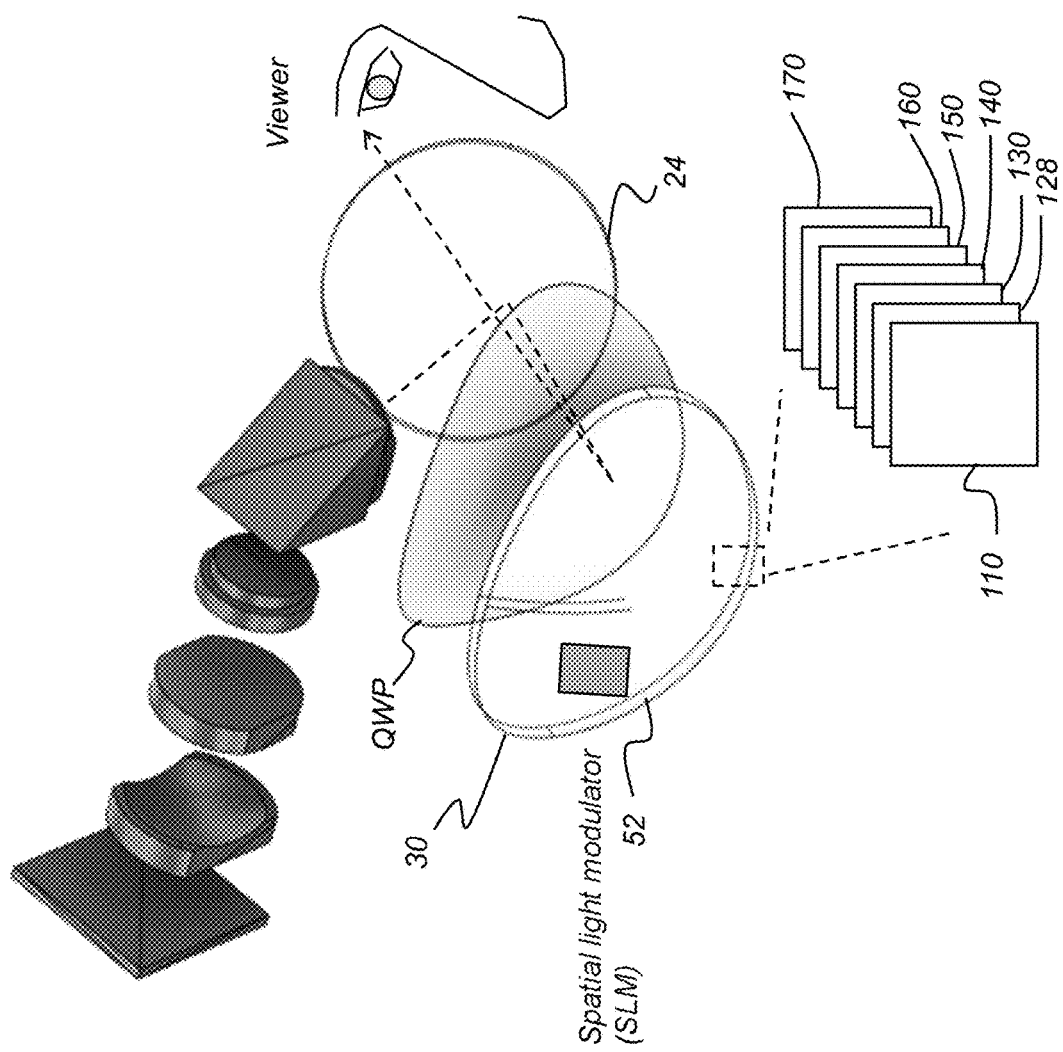
FIG. 4D is a schematic diagram that shows an alternate embodiment in which a spatial light modulator (SLM) is formed as a liquid crystal device (LCD) in a layered arrangement.

The schematic diagram of FIG. 4D shows an alternate embodiment in which SLM 52 is formed as a liquid crystal device (LCD) in a layered arrangement, deposited on the outer surface of curved mirror 30. From the innermost layer toward the outermost, the sequence of layers can be as follows: a bottom polarizer 170 is formed on a substrate 160; a thin film transistor 150 is formed against a liquid crystal layer 140; there is a common electrode layer 130 on a substrate 128, followed by a top polarizer layer 110.

Figure 4E:
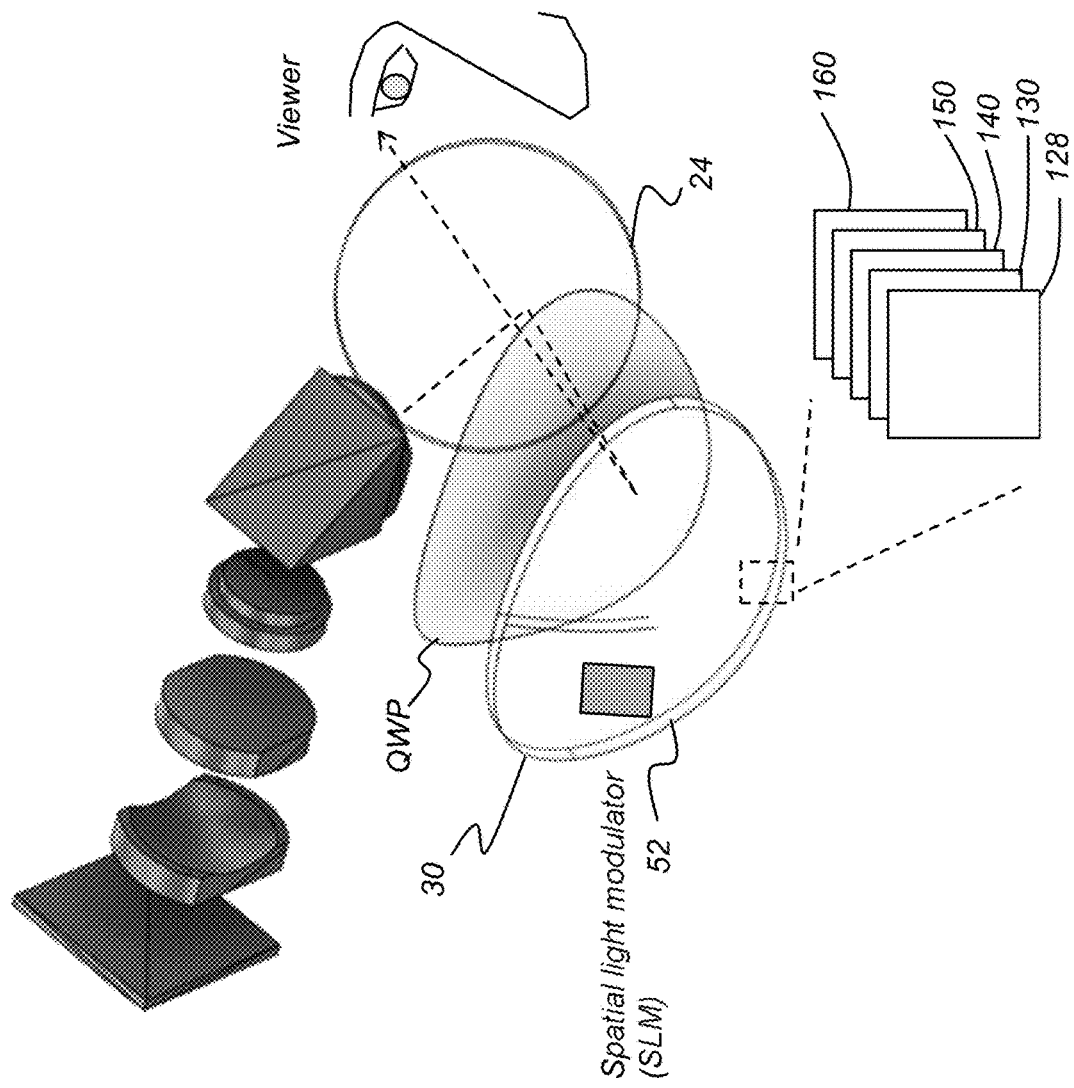
FIG. 4E is a schematic diagram that shows an alternate embodiment in which a spatial light modulator is formed as a transmissive liquid crystal device or as an OLED device in a layered arrangement.

The schematic diagram of FIG. 4E shows an alternate embodiment in which SLM 52 is formed as a transmissive liquid crystal device (LCD) in a layered arrangement deposited or otherwise formed onto the outer surface of curved mirror 30, without polarization. From the innermost layer toward the outermost, the sequence of layers can be as follows: a substrate 160 has a thin-film transistor layer 150; a liquid crystal layer 140 is formed onto a common electrode layer 130 and an exterior substrate 128 layer is used.

The schematic diagram of FIG. 4E can also show an alternate embodiment in which SLM 52 is formed as a transparent OLED in a layered arrangement on the outer surface of curved mirror 30, without polarization. From the innermost layer toward the outermost, the sequence of layers can be as follows: substrate 160 has a thin-film transistor layer 150 deposited thereon; an OLED liquid crystal layer 140 is deposited or otherwise formed onto a common electrode layer 130 and an exterior substrate 128 layer is used.

Figure 4F:
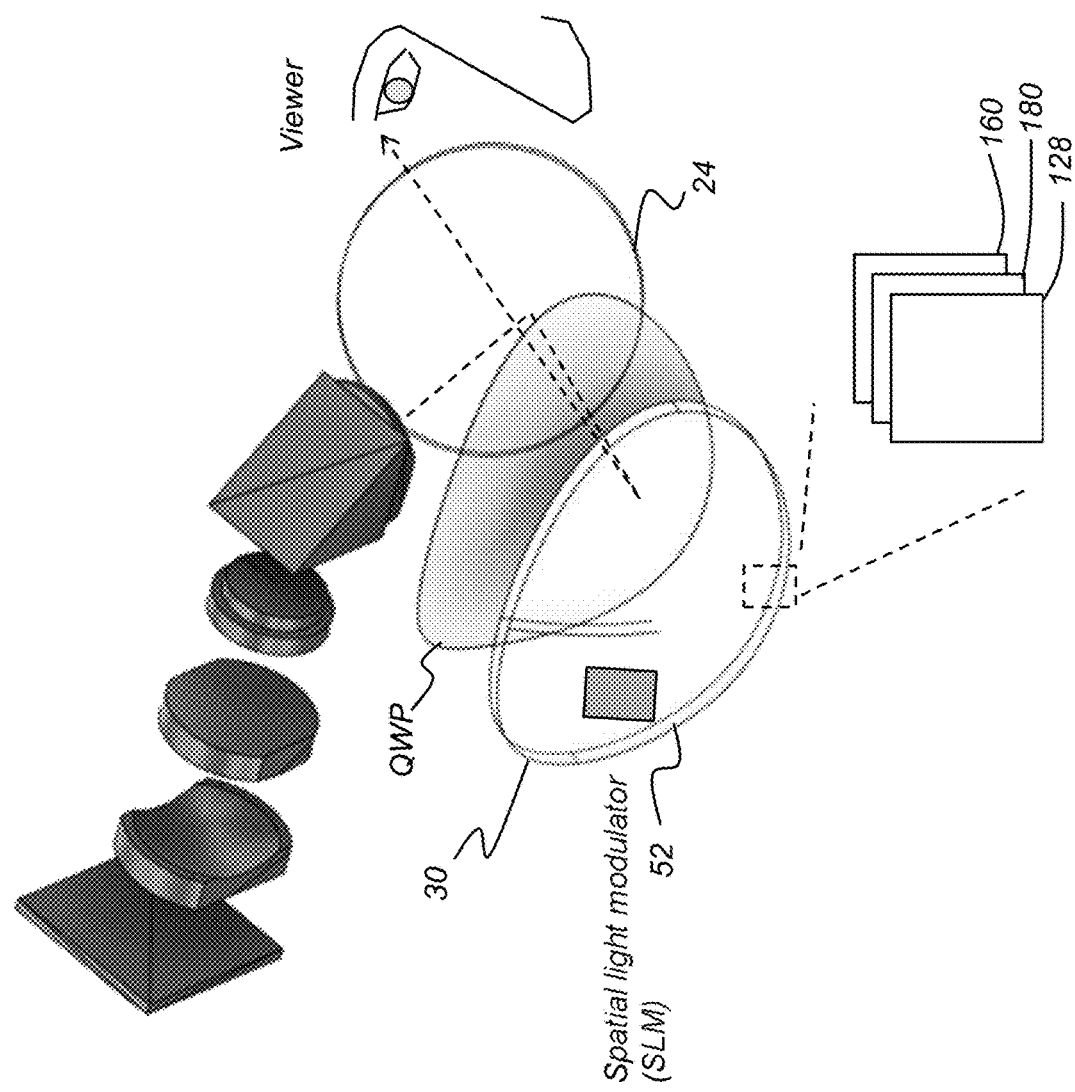
FIG. 4F is a schematic diagram that shows an alternate embodiment in which a spatial light modulator is formed as a photochromic device in a layered arrangement.

The schematic diagram of FIG. 4F can also show an alternate embodiment in which SLM 52 is formed as a photochromic layered combination deposited on the outer surface of curved mirror 30. From the innermost layer toward the outermost, the sequence of layers can be as follows: interior substrate 160, a photochromic dye layer 180, protected by exterior substrate 128. According to an alternate embodiment, an electro-photochromic surface that has addressable pixels could be disposed in the position shown for SLM 52 in FIG. 4B.

According to yet another alternate embodiment, polarization beam splitter 24 can be dynamically controlled to reduce the amount of light from the visible scene without corresponding reduction in the light used to form the virtual image. For example, a suitable coating can be provided for controlling opacity over portions of the beam splitter surface. Polarization beam splitter 24 can be conditioned with one or more dynamically addressable areas for selective control of polarization to change opacity for visible light from the object field, according to dimensions of the generated 2D image.

Other components that could incorporate the function of SLM 52 related to selective image masking or attenuation can include curved mirror 30 and QWP.

Any of a number of types of sensors can be used to detect relative brightness levels of ambient light and provide a signal or other information that indicates when system response is appropriate.

The amount of attenuation for a particular eye can be adjusted over a range, depending on the relative opacity that can be achieved by the optical system. According to an embodiment, the optical system can be changed to a virtual reality (VR) system by changing the nominal opacity of the SLM to 100%.

The control logic processor that provides variable modulation of light transmission according to ambient brightness is termed a model view controller (MVC). Resolution of the polarizer or SLM used for attenuating light from the object field can differ from the resolution used to form the virtual image.

The model controller can be programmed to automatically compensate for external brightness and respond to the brightness level for improving the visibility of the AR image as described herein. In an embodiment, the entire exterior layer of the curved mirror may tint much like a light valve to balance the bright external light, and may still provide additional opaqueness on the portion of the mirror where the virtual video or picture or image is formed. Alternately, the light valve can be used to completely black out the reflected image lens so that the augmented reality behavior is eliminated and the HMD temporarily becomes a VR display, blocking all real-world visibility and only displaying information/images from image generator 10.

Further, this disclosure teaches that dynamic control of relative opacity for the optical system can be optionally modulated using shaders, such as shader rendering utilities provided for a graphics processing unit (GPU). Shading languages are usually used to program the programmable GPU rendering pipeline, which has mostly superseded the fixed-function pipeline that allowed only common geometry transformation and pixel-shading functions. However, with shaders, various advanced customized effects can be used. The position, hue, saturation, brightness, and contrast of all pixels, vertices, or textures used to construct a final image can be altered on the fly, using algorithms defined in the shader, and can be modified by external variables or textures introduced by the program calling the shader programming.

In order to provide improved visibility of the generated virtual image content, an embodiment of the present disclosure may use control executed by a display controller and may work in tandem with the information displayed. The display controller may create an image buffer for the projected virtual display, and this information may be shared with the display controller, which may then activate the pixels corresponding with the exact or near exact location where the display controller is projecting the virtual image.

According to an alternate embodiment, the variable opacity of the field of view can be controlled using a Bluetooth or other wireless controller. In this approach, the user may control the transparency, size, and/or location of relative opacity based on input from a wireless controller. The controller could use any number of wireless protocols to communicate with the HMD. Some protocols that could be used include Bluetooth, BLE, IrDA, RC-5, ZigBee, xbee (IEEE 802.15.4), or any method described in IEEE 802.15, Wi-Fi (2.4 ghz or 5.8 ghz IEEE 802.11b/g/n/ac), WiGig (IEEE 802.11ad) or alternate protocols and frequencies. Alternately, transmission could use fiber optics or other light-based transmission method. The controller could utilize mechanical buttons, sensors, capacitive inputs, and/or IMU (inertial measurement units containing between 1 Dof and 12 Dof). Parts in an inertial measurement unit can include any, all, and/or multiples of gyroscope(s), accelerometer(s), thermometer, and magnetometer(s) data.

According to another embodiment, variable opacity may be controlled by a wired controller, with the viewer controlling transparency, size, and/or location of the opacity based on input from a wired controller. The controller could utilize mechanical buttons, capacitive inputs, and/or IMU (inertial measurement units containing between degree of freedom (1 DoF, degree of freedom) and 12 DoF). Parts in an inertial measurement unit can include any, all, and/or multiples of gyroscope(s), accelerometer(s), and magnetometer(s).

According to an embodiment, variable opacity may be controlled by voice control. The user may control the transparency, size, and/or location of the opacity using voice input. The voice command may be captured by the system either continuously or after an activation word (i.e. Alexa, hey google, etc.) and processed through speech recognition technologies.

According to an embodiment, aspects of variable opacity can be controlled with gestures. Using gestures, the viewer can control parameters including relative transparency, size, and/or location of the opacity based on a gesture. These gestures could be interpreted by the system through the use of gesture recognition cameras (algorithms to detect gestures based on a camera input), IMU data (algorithms to detect gestures using inertial measurement units containing between one and twelve degrees of freedom (DoF). Exemplary components used for inertial measurement unit can include any, all, and/or multiples of: gyroscope(s), accelerometer(s), and magnetometer(s) and the like.

According to an alternate embodiment, variable opacity may be controlled by head tilt or body motion control input. In another embodiment, a blur or "dynamic diffusion" can be created to cause a blur in a selected region or throughout the whole FOV. Transmission can selectively be enabled through a specified portion of the curved mirror 30 or using a pixellated component. The HMD optics can support various opacity modes such as: on/off; gradient; left/right; side; top, bottom; alpha matte; glow; ambient light response; or other modes, and the other expressions of operation as identified herein.

According to an embodiment, the HMD can provide variable opacity controlled according to location data. In another embodiment, opacity can be controlled according to sensing of ambient light by an ambient light sensor. In another embodiment, the variable opacity may be controlled to correspond with the virtual image that is formed. In another embodiment, the variable opacity may be controlled according to eye tracking.

In another embodiment, the variable opacity can be switched or alternated between left and right eyes, such as controlled by an oscillator in the headset ("alternating occlusion training").

According to an alternate embodiment, a simple reduction of the image can be executed. This is useful because a part of the image or video may need to be "cut out" in software and repositioned on the next adjacent space to a defect or deficit in the eye.

It must be remembered that the entire retina, except in the case of disease such as macular degeneration, is the light and color sensitive tissue that lines the inside of the eye. As such, the retina functions in a manner similar to film in a camera, hence this invention supplements the retina's camera effect by providing an augmented, mixed reality duality of vision to the HMD user using both external camera(s) and display(s) of AR/VR images, as well as the eye's natural vision of the RR. Because it is important to make the augmented video or image hit as many cones as possible along with RR, the higher the rate of resolution, the better, while the resolution of any modulated regions along the optical path need not necessarily match that of the AR/VR image(s).

Thus, in one aspect of the disclosure, the image to be displayed can extend over the entire 220 degrees of normal eye vision, and HMD compensation may be similarly mapped to the full FOV. According to another aspect of the present disclosure, the image may be displayed over 90 degrees, 80 degrees, or 50 degrees or less FOV, and the corresponding compensation may exceed or be less than the angular extent of the AR/VR FOV image projection area.

Part of the duality of the vision relates to the real-world view of the object scene (termed RR herein) that the HMD user sees adequately where there is no augmented modified video, typically on the periphery of the lenses of the glasses and beyond that, simply the user's own unrestricted vision.

Figure 9:
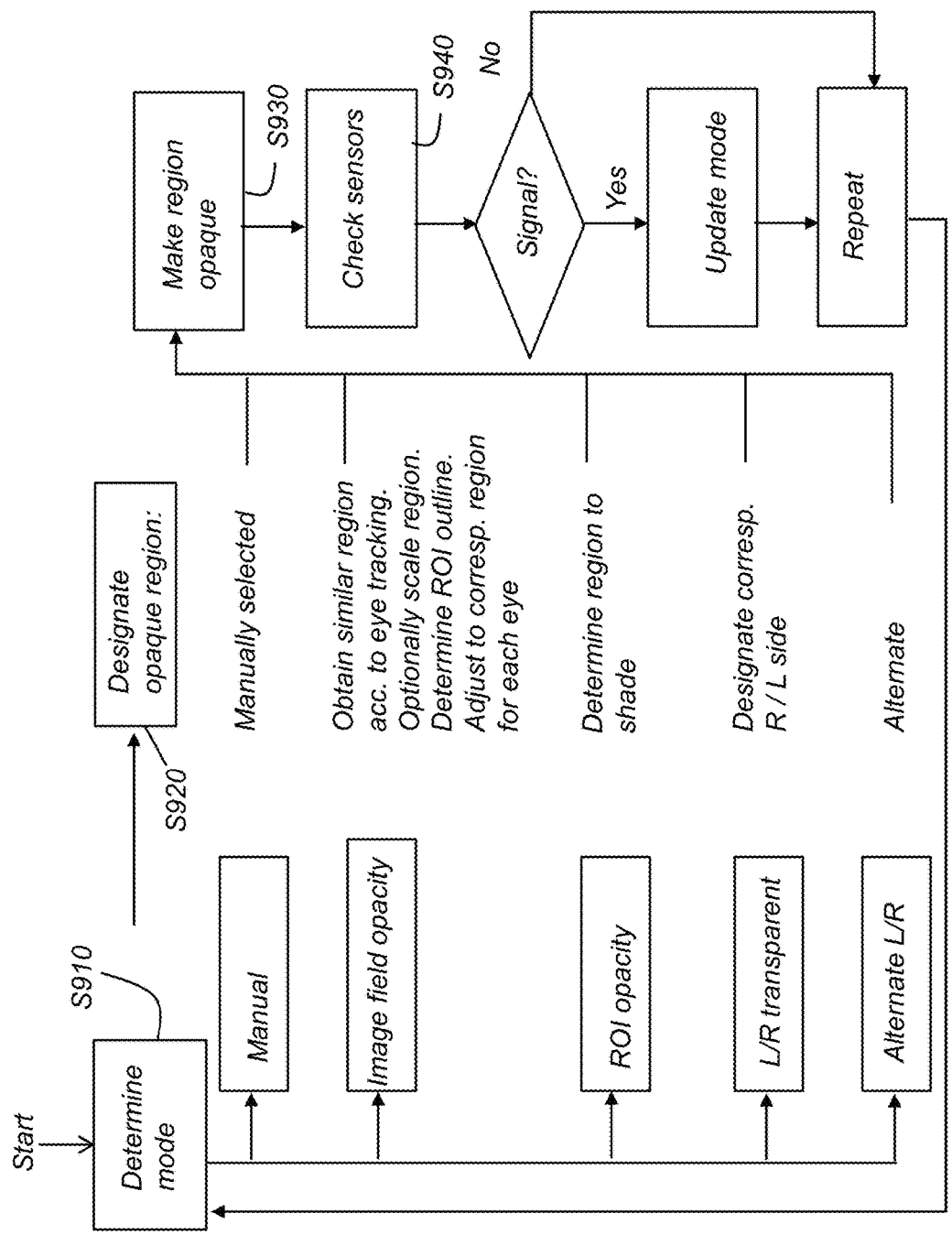
FIG. 9 is a logic flow diagram that shows exemplary the architecture, function, and operation of possible implementations of systems, methods, and computer program products for variable opacity.

The logic flow diagram in FIG. 9 shows exemplary the architecture, function, and operation of possible implementations of systems, methods, and computer program products for variable opacity, according to various embodiments of the dynamic opacity solution described herein. A repeated loop can be executed. An initial mode determination step S910 can determine how the affected region is selected, such as by manual selection, using a command entry interface or using audible, gesture, or touch commands, for example. Alternately, eye gaze tracking can be used, as well as ROI detection, left- or right-eye selection, or alternating left/right eye selection. Various sensors for mode selection can include wired or wireless sensors, head tilt sensors, body motion detection, server commands, and other sensors for detecting when a mode change is needed. Once the region to be made opaque is selected, sensors can be continually monitored for indication of a needed change and mode update. A region designation step S920 specifies the desired region of operation. A modulation step S930 then applies the needed modification for region brightness. A check step S940 determines if need for change of mode is sensed.

Each block in the flowchart FIG. 9 may represent a module, segment, or portion of code, which comprises one or more executable instructions for implementing the specified logical function(s). It can also be noted that each block of the block diagrams and/or flowchart illustration, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture, including instruction means which implement the function/act specified in the flowchart and/or block diagram block or blocks.

Image Relay 40

Figure 5:
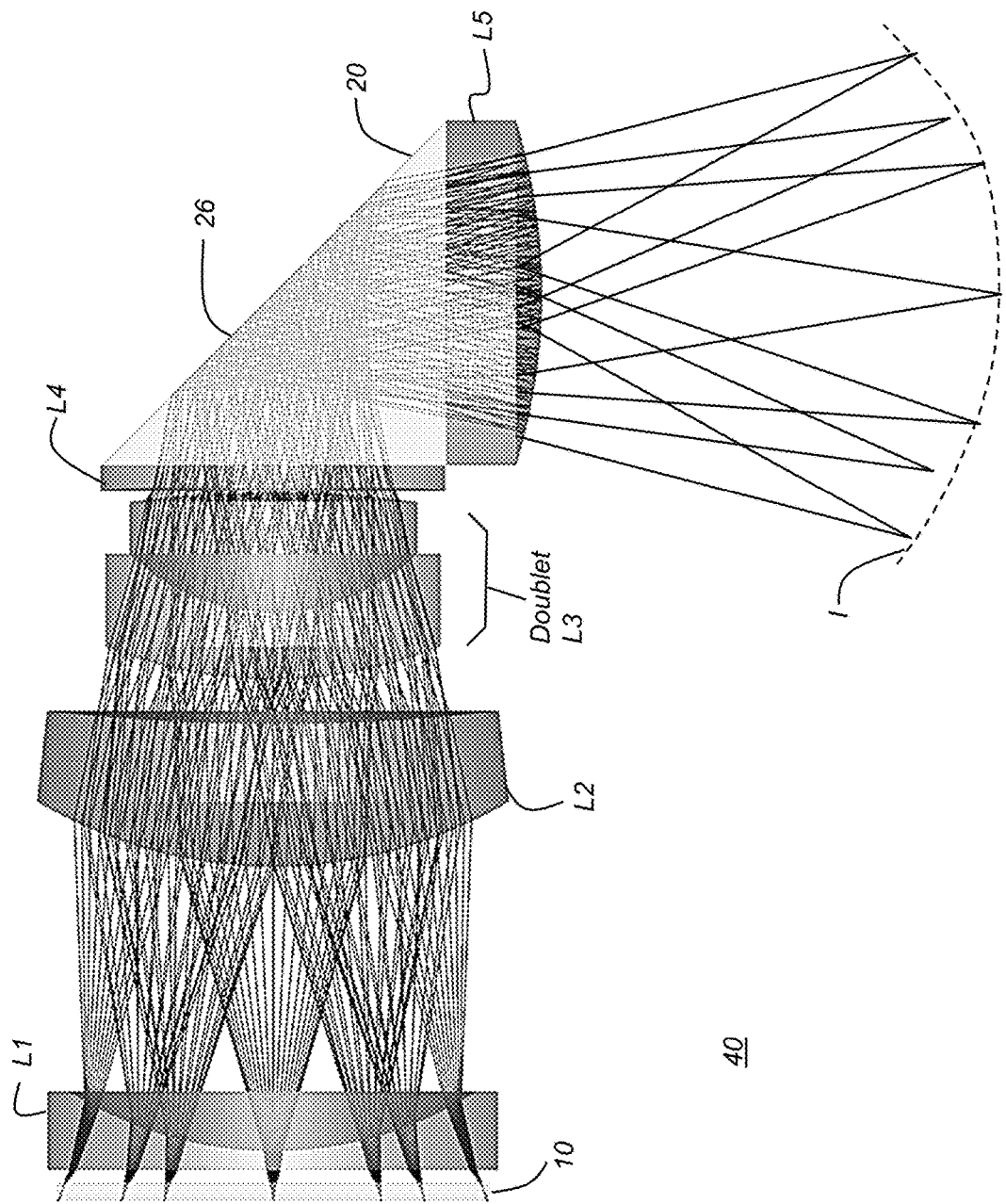
FIG. 5 is a side view schematic of an image relay.

FIG. 5 shows an enlarged side view of relay 40 for relay of the display image (OLED in the examples shown) to the focal surface position of mirror 30 (FIG. 3B) and for shaping the relayed image to suitable curvature to correct distortion. A concave-plano field lens L1, with sides truncated along the vertical direction as shown in FIG. 4 in order to reduce weight and provide a more compact system, shapes the light from OLED image generator 10, providing a beam to a meniscus singlet lens L2.

From lens L2, the imaging light goes to a doublet L3 having a concave/convex elliptical flint glass lens cemented to a crown glass lens, for example.

An aspheric plano-convex lens L4 is in optical contact with the input face of prism 20, such as cemented to prism 20. A second plano-aspheric lens L5 is cemented to the output face of prism 20. This cemented arrangement facilitates alignment of these optical components.

The turning surface 26 of prism 20 is coated to enhance reflection. Hypotenuse or turning surface 26 of the prism is essentially the relay (and system) stop.

Intermediate image I is formed in the shape and location of the focal surface of the curved mirror. Proceeding backward along the optical path from intermediate image I are the following components:

Plano-asphere lens L5;
Folding prism 20 with turning surface 26;
plano-asphere lens L4;
Doublet L3;
Meniscus singlet L2;
Field lens L1;
Image source or generator, display 10

Figure 6A:
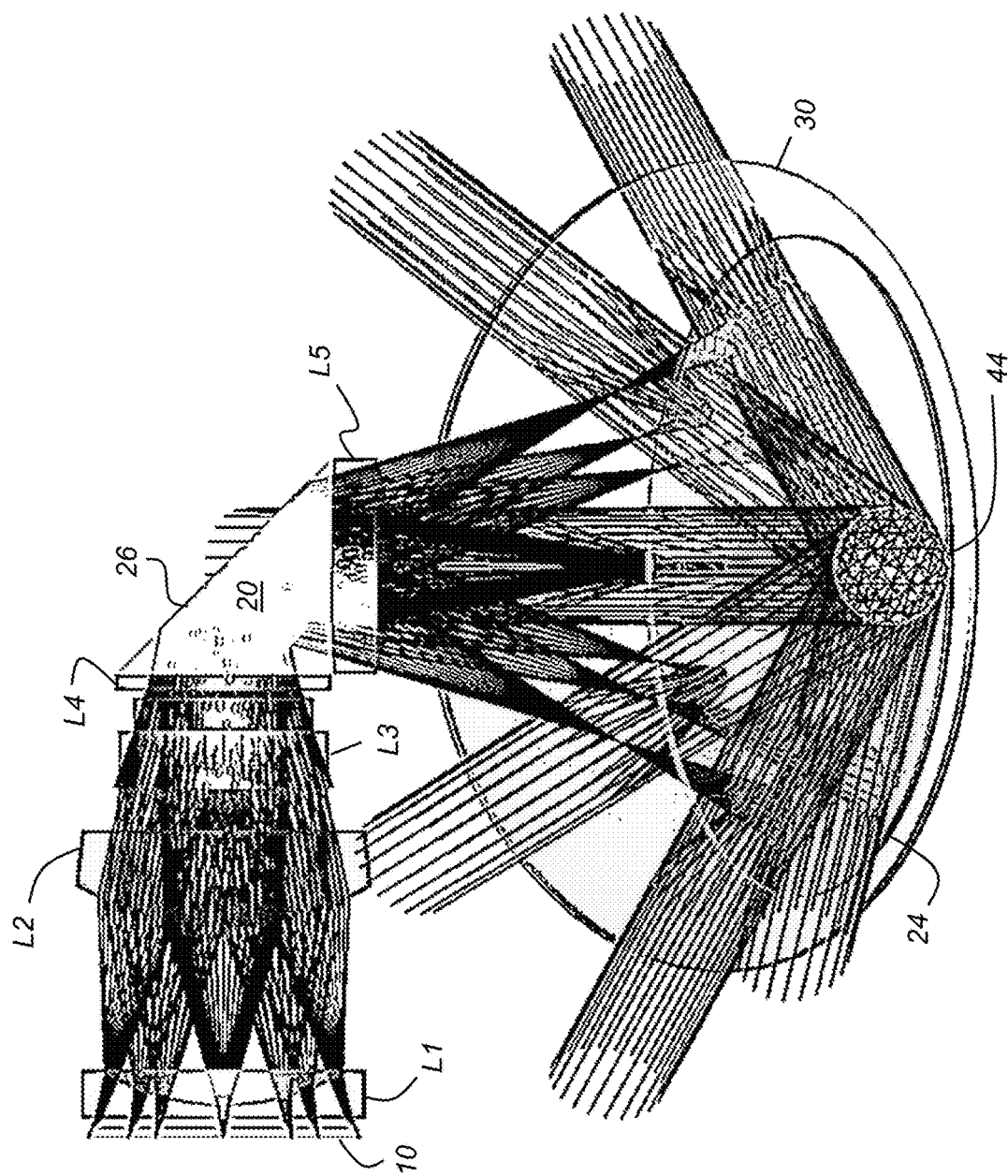
FIGS. 6A, 6B are schematic, showing the image relay and components for forming the exit pupil.
Figure 6B:
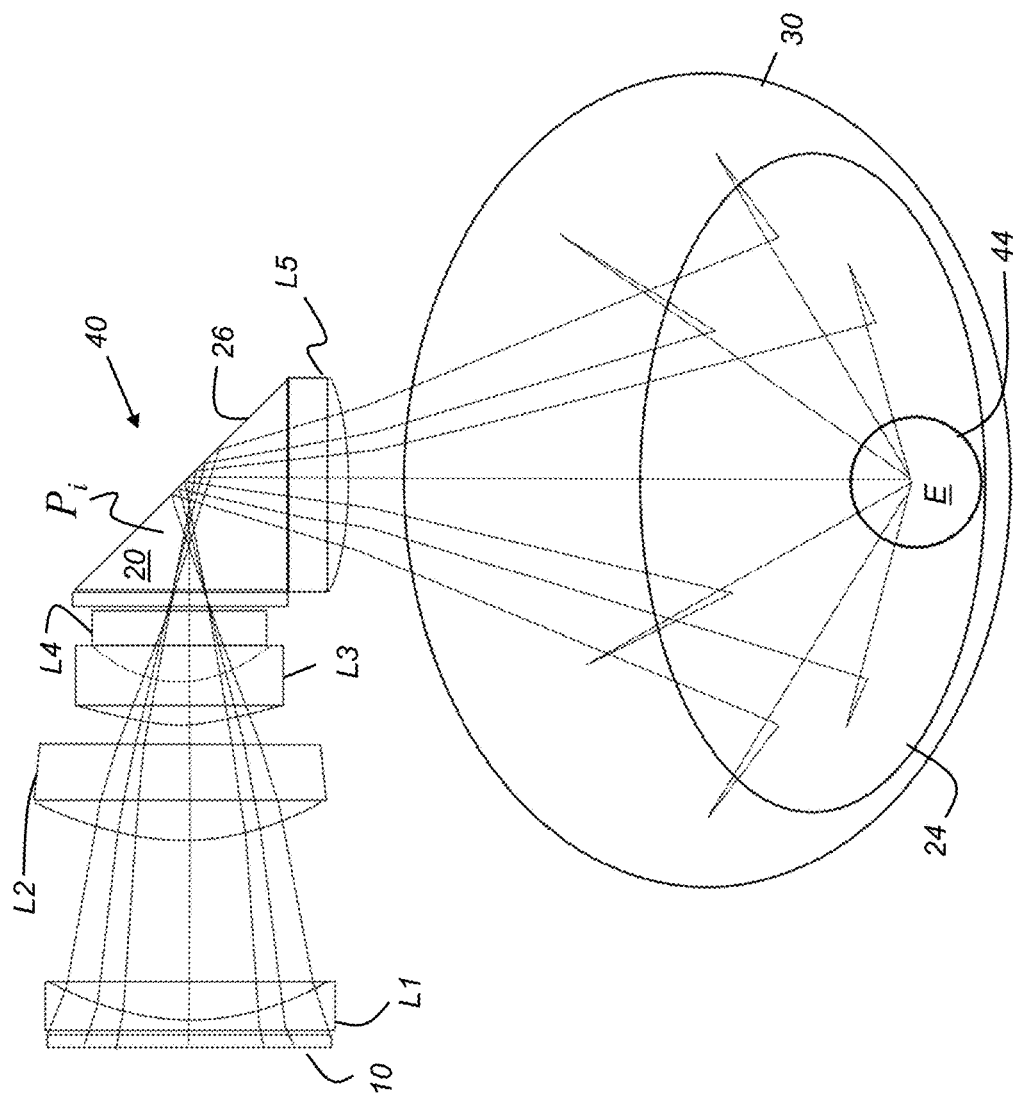

FIG. 6A and simplified FIG. 6B show an alternate view of the display optics from exit pupil 44. Chief rays are shown in FIG. 6B; these converge at the position of exit pupil 44 at eye E. FIG. 6B also shows the approximate position of an intermediate pupil P, at the aperture stop, near the folding surface 26 of prism 20.

Figure 1A:
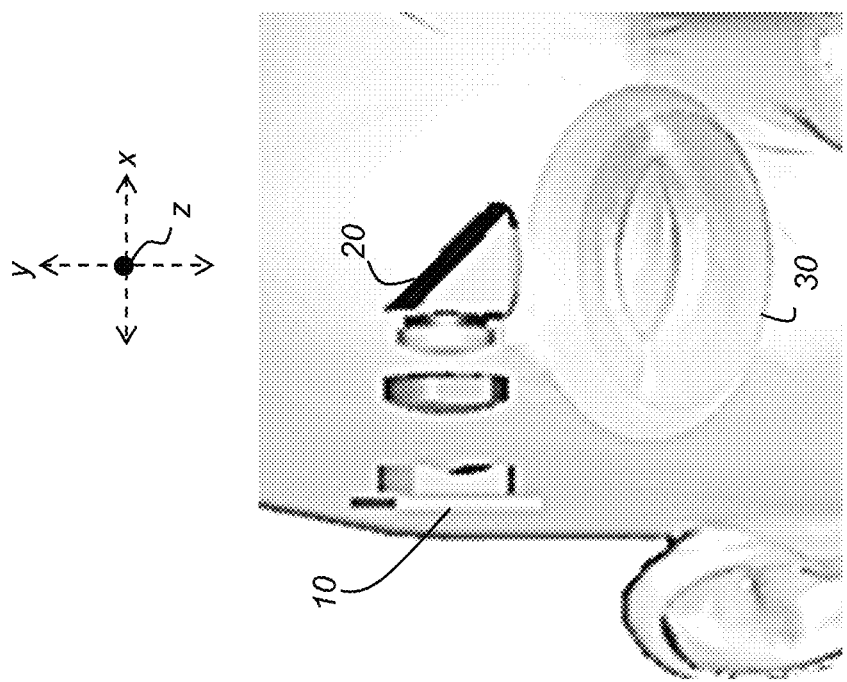
FIG. 1A is a schematic front view showing placement of optical components of the system.
Figure 2B:
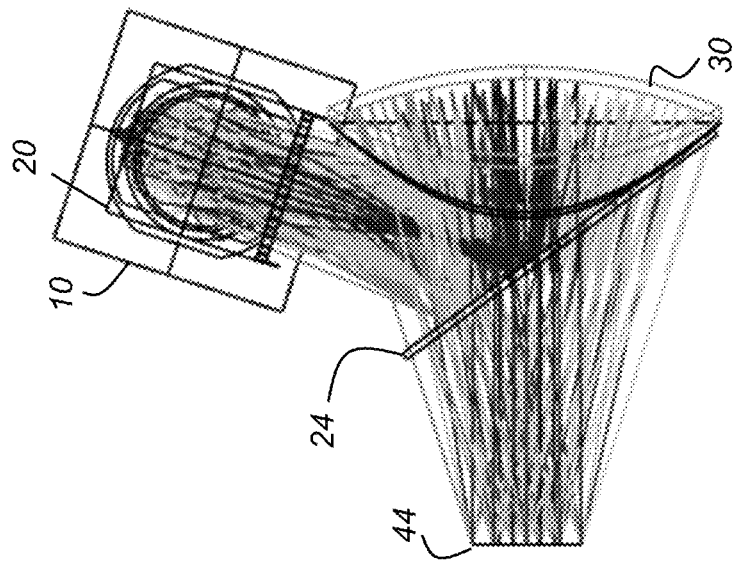
FIG. 2B is a schematic side view showing the optical path through components of the system.
Figure 2A:
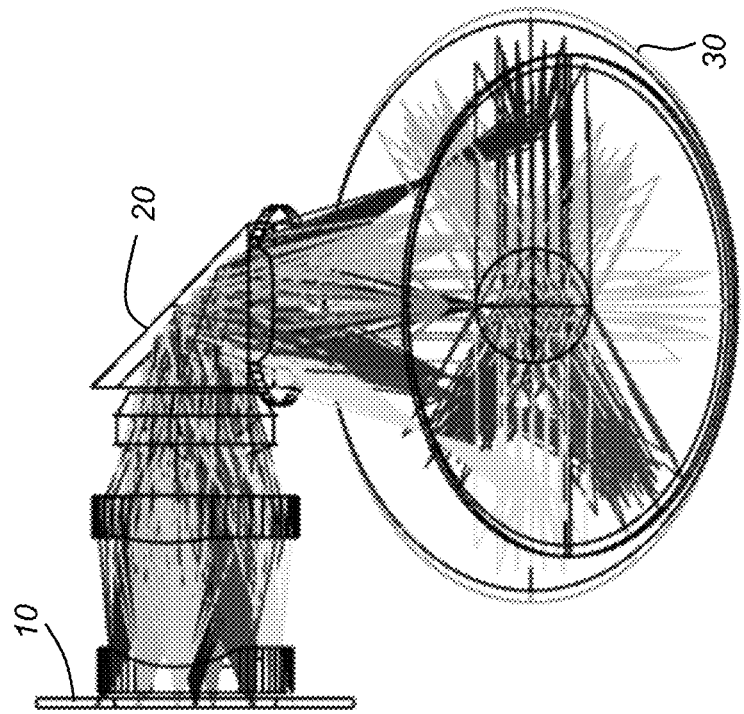
FIG. 2A is a schematic front view showing the optical path through components of the system.
Figure 3A:
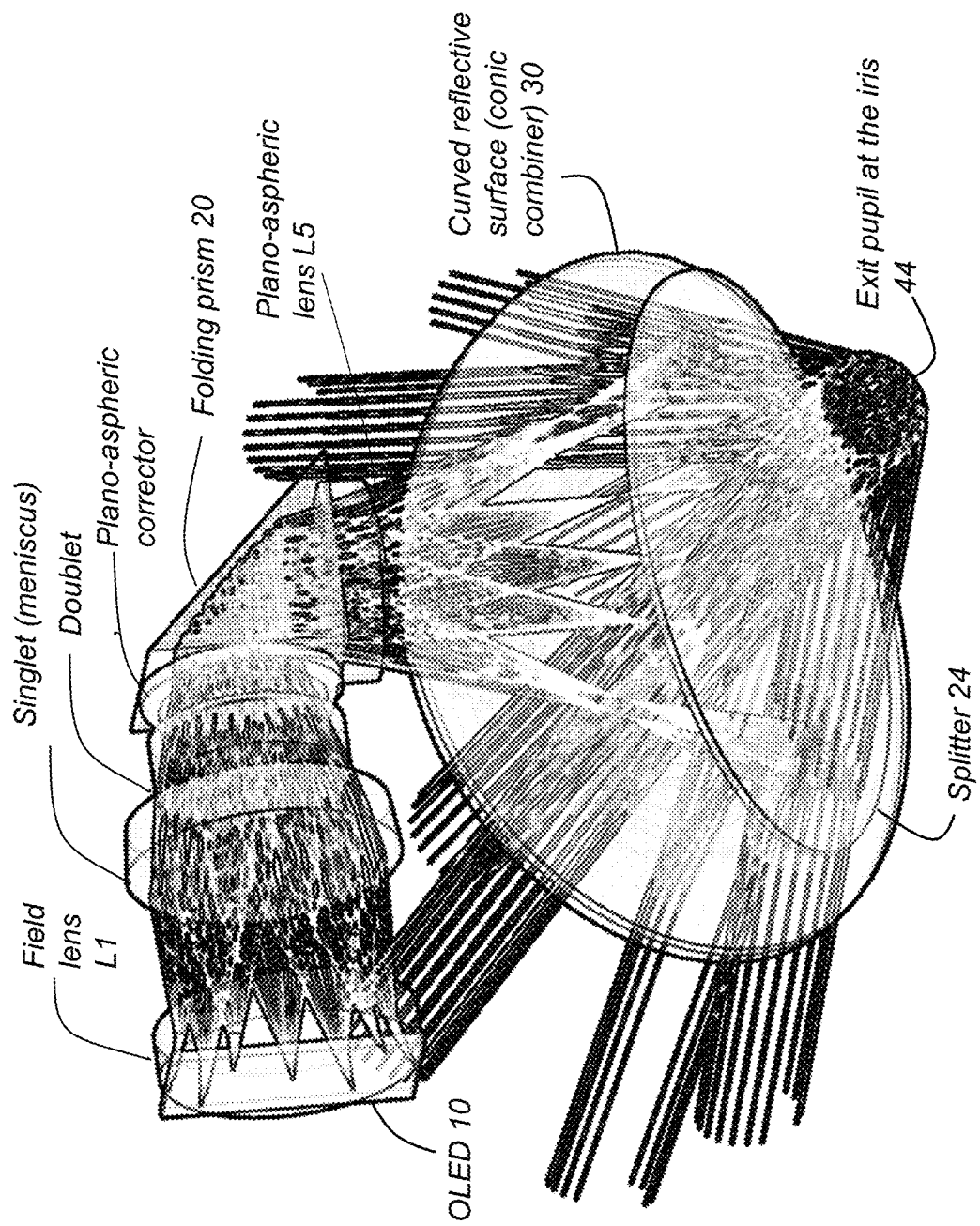
FIG. 3A is a schematic that shows, in perspective view, components of an optical apparatus for AR viewing.
Figure 3B:
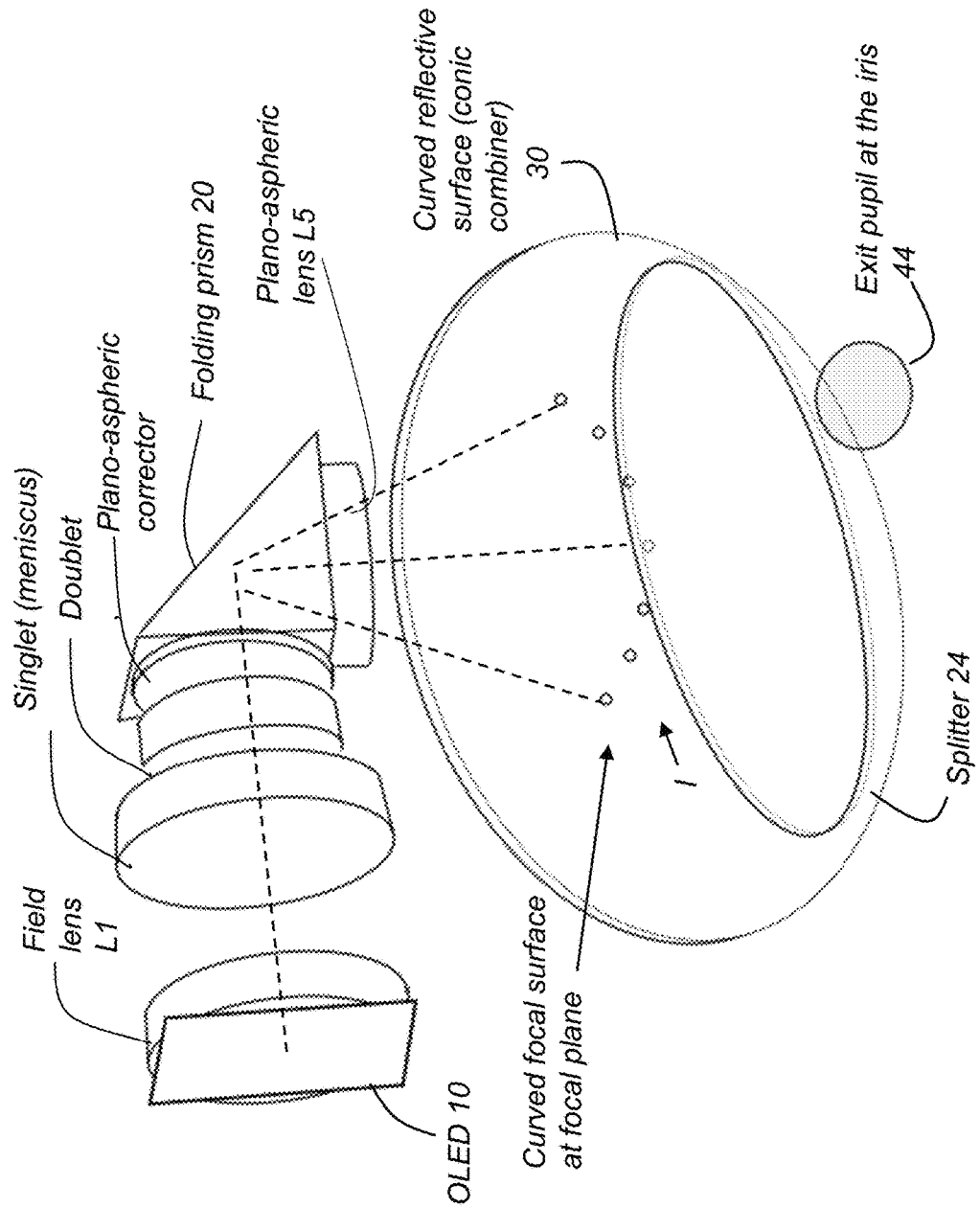
FIG. 3B is a simplified schematic of FIG. 3A.

As shown in FIGS. 1A and 4, the image generator is disposed to direct image-bearing light beam in a horizontal direction and along a path that lies above eye-level, as the display optics are normally worn by a sitting or standing viewer. Prism 20 can be tilted slightly away from the forehead of the viewer, to direct light in front of the face at an oblique angle to vertical, as shown in the embodiment of FIG. 2B.

The layout and routing of the optical path are particularly suitable for providing augmented reality viewing in a wearable device. Using relay 40 allows the positioning of image generator 10 to be out of the direct field of view; in addition, relay 40 allows image generator 10 to be positioned at sufficient distance away from the skin surface to avoid contact and consequent discomfort. The use of a first x-direction (horizontal) fold, followed by a y-direction (vertical) folding enables the imaging optics to be compactly packaged with reasonable optical path distance to allow a measure of light beam shaping and correction. Prism 20 can be rotated over at least a range of angles about the x axis, allowing a measure of alignment as well as adaptation to different mirror 30 curvatures. By employing a curved surface for an optional QWP component, distortion of the visual field can be reduced.

Using a wire-grid polarizer reduces light loss, allowing high levels of visibility to the external scene content, along with reduced light leakage over other polarization components.

Image source 10 may be unpolarized. In one embodiment, a polarizing beam splitter is used, such as a wire grid splitter made by Moxtek, Inc., Orem, Utah. This type of beam splitter reflects only one polarization, usually S polarization, towards the conic combiner. The orthogonal polarization, P polarization, is transmitted and is absorbed (absorber not shown). To prevent the small amount of P-polarized light from being reflected, an optional polarizer can be placed at the image source.

The mirror 30 provides a conic combiner in embodiments shown, with power only for the generated image and not for the visible field. The curved mirror 30 can be a double conic for improved image formation.

Embodiments of the present disclosure provide a measure of distance between the image generator (OLED or other device) and the face and temple of the viewer. This helps to prevent discomfort due to heat where the wearable display is worn for an extended period of time.

The particular arrangement of image-forming components provides suitable image quality and high resolution to allow reading and other visual activity involving fine detail.

According to an embodiment of the present disclosure, the optical system described herein is suitable for applications requiring sensitivity to the viewer, including not only viewer comfort, but some level of vision monitoring and adaptation. For example, the apparatus described herein can be used as part of a system for compensating for vision problems.

Figure 7A:
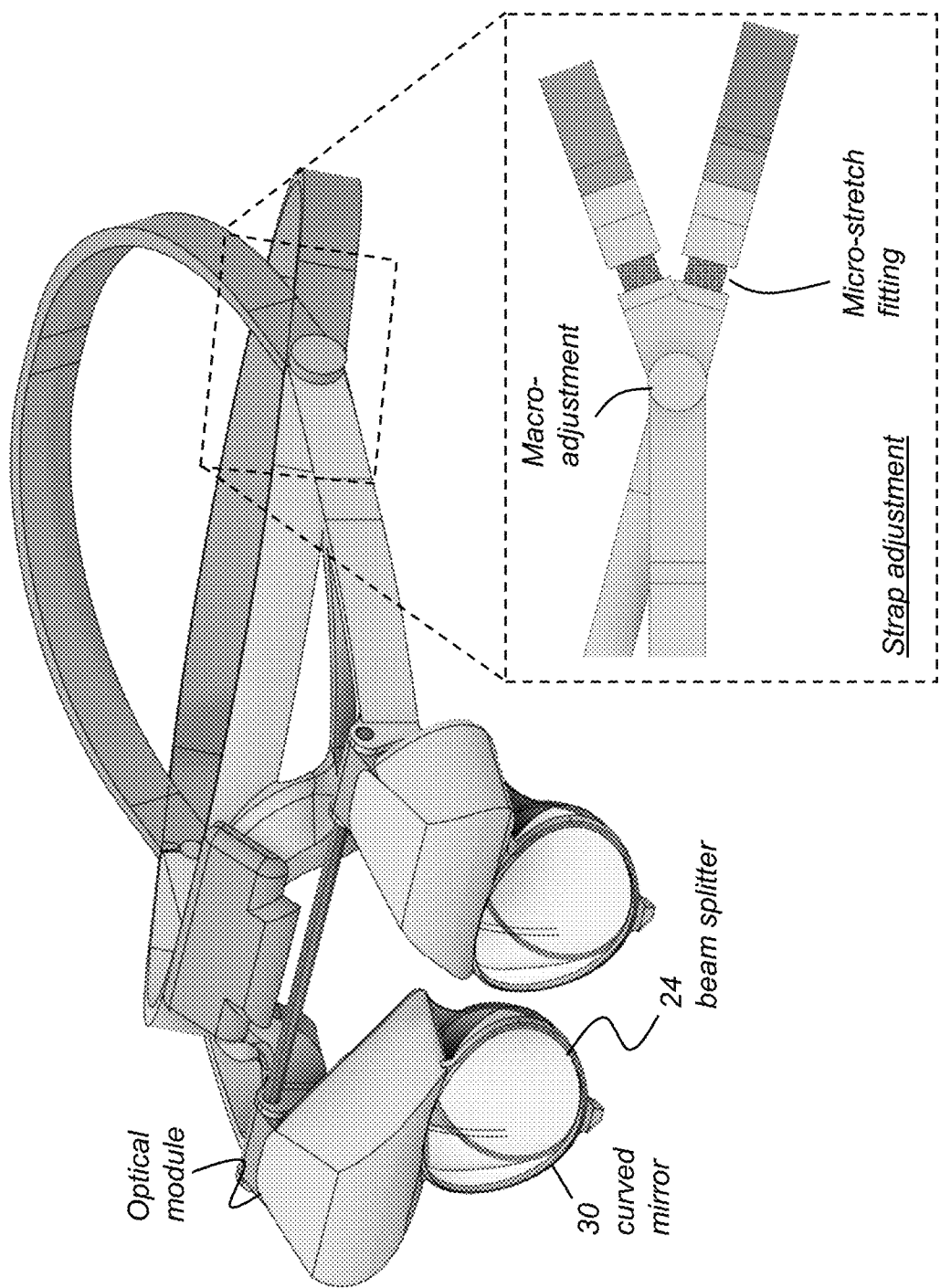
FIGS. 7A-7C show various features of an embodiment useful for compensating for macular degeneration.
Figure 7B:
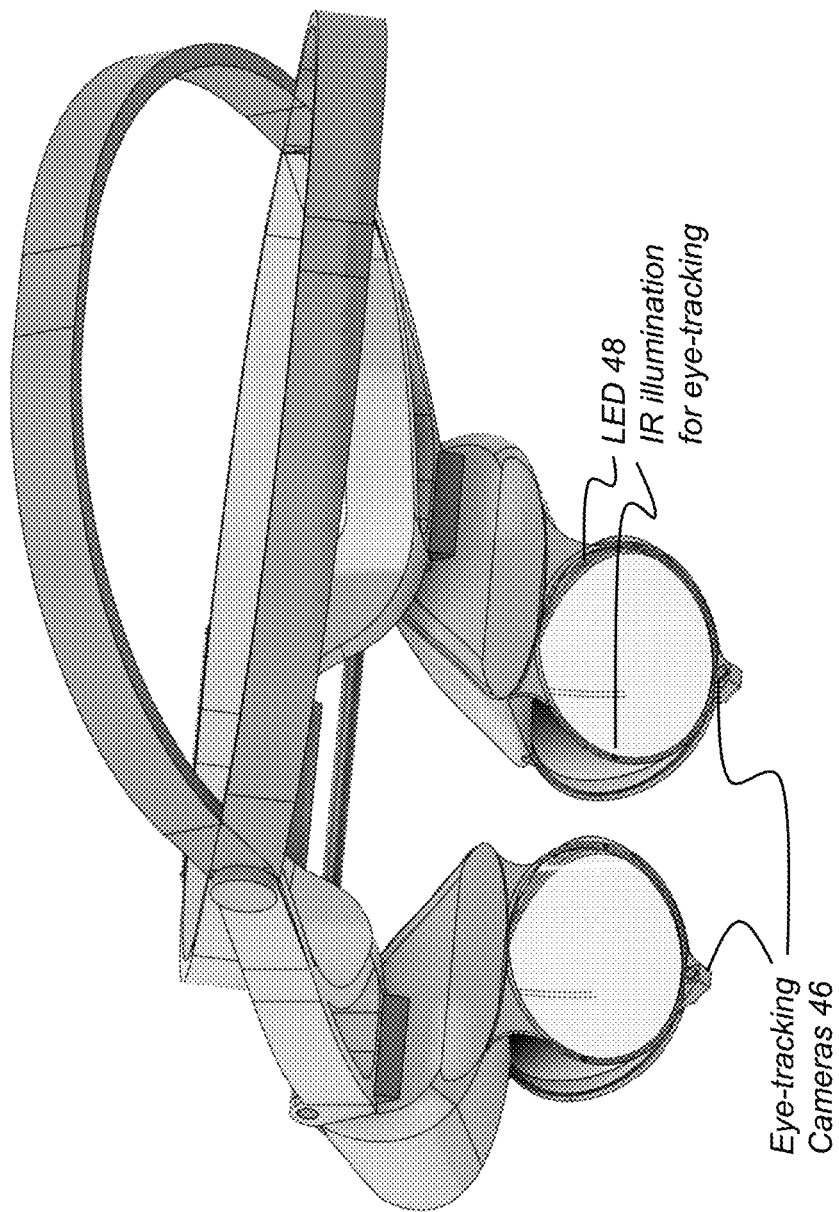
Figure 7C:
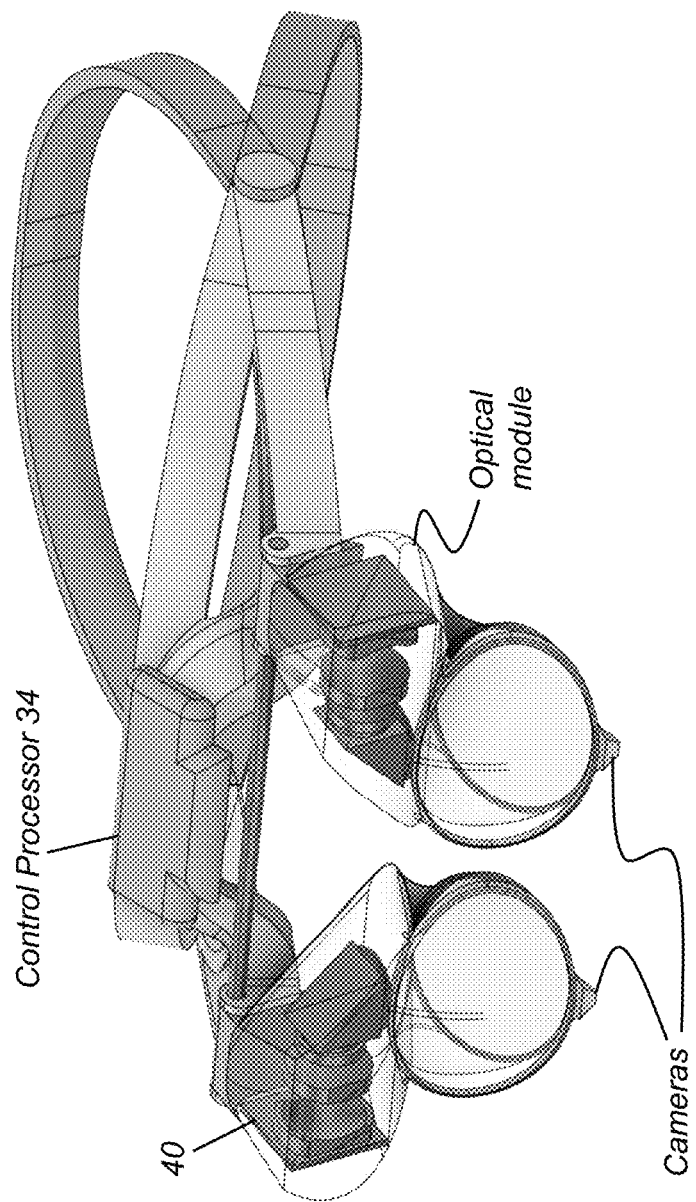

By way of example, FIGS. 7A-7C show various features of an embodiment of a head-mounted display (HMD) 100 that provides AR capability to both eyes and is useful for compensating for macular degeneration. This type of application can require a measure of viewer monitoring and adaptation, possibly including adjustment of generated data content suitable for the viewer. The optical system described previously with reference to FIGS. 1-6B is provided for each eye, with corresponding changes for right-eye, left-eye positioning.

As particularly shown in FIGS. 7A and 7C, the relay 40 can be compactly packaged within an optical module that is disposed above eye level, as the system is normally worn. Beam splitter 24 and curved mirror 30 lie along the visual axis of the viewer. A control processor 34 can include the needed electronics for controlling operation of the optical apparatus; processor 34 components can be mounted above the visual axis and disposed away from the viewer's forehead.

Eye-tracking can be provided using one or more eye-tracking cameras 46, working in conjunction with illumination LEDs 48, typically infra-red (IR) sources, as shown in FIG. 7B.

For viewer comfort, a strap adjustment can be provided, allowing both a one-time fastener positioning adjustment and a flexible stretch band.

The HMD may also include a strap and counterweight or other headgear to balance the HMD and maintain its position on the head. The HMD may contain a "pinch adjustor" to adjust the strap. In addition, the HMD may or may not include a "dongle" whereby one or more of the systems or subsystems may be connected via wire or wireless to another device, such as could be worn on a belt or carried in a pocket to reduce the overall weight of the HMD 100. In one embodiment, the HMD may be connected to another device which is providing power, while in an alternative embodiment, the HMD may have its own power from the mains or from wireless power transmission or from a battery.

Further, in another embodiment, the HMD may house other subsystems such as cameras, microcontrollers, connectors, central processing unit, graphics processing unit, software, firmware, microphones, speakers, display, and collector lens; displays, and other subsystems.

Sensors

Figure 8:
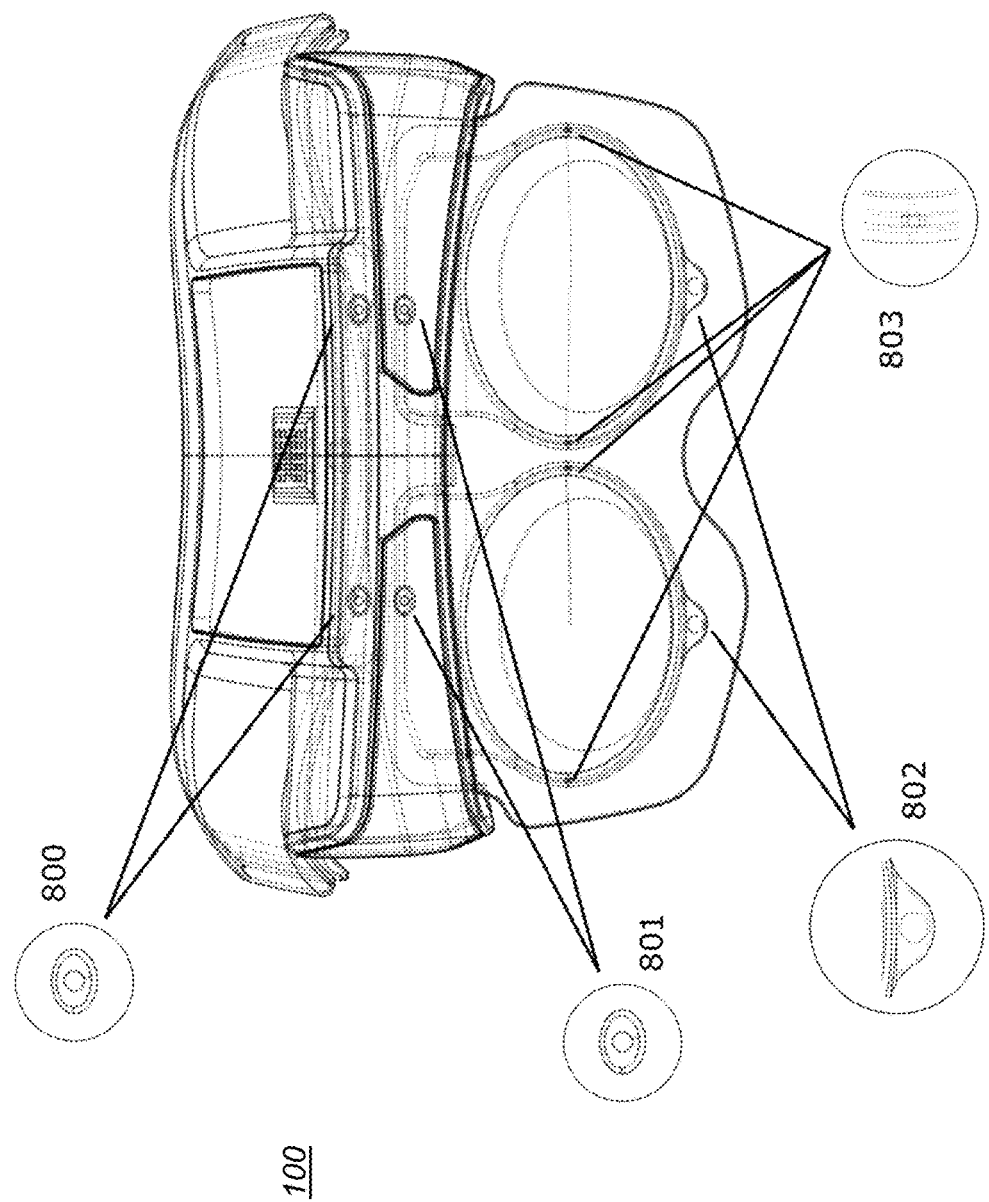
FIG. 8 is a diagrammatic illustration of various sensors that can be provided to support various HMD 100 functions.

FIG. 8 is a diagrammatic illustration of various sensors and modalities such as computer vision which can be provided to support various HMD 100 functions. These sensors, modalities, and controllers can include (i) high-resolution cameras 801;
(ii) one or more additional displays per eye;
(iii) 6 to 9 degrees of freedom sensor or other sensors such are necessary for hand-gesturing, head-gesturing, voice control, positional location, and estimation or navigation;
(iv) optical character recognition (OCR) and object recognition (OR) software and sensors;
(v) marker-based or markerless-based AR sensors for fiducial markers;
(vi) location sensors 800;
(vii) one or more SLAM (simultaneous localization and mapping) sensors 803;
(viii) concurrent odometry and mapping sensors;
(ix) microphones and noise-cancelling microphones;
(x) motion sensors;
(xi) gesture recognition sensors;
(xii) infrared sensors 802;
(xiii) alert sensors, such as to alert the user to some danger;
(xiv) positional tracking sensors;
(xv) audio sensors;
(xvi) temperature sensors;
(xvii) ambient light sensors;
(xviii) time-of-flight sensors;
(xix) holographic sensors;
(xv) environmental sensors;
(xvi) light-field sensors or controllers.

In addition, the HMD can have any other sensors 803 which could be used on an AR/VR headset, with sensors 803 disposed at any suitable position on the headset. FIG. 8 also shows placement of an IR light for an eye-tracking subsystem.

The above listing is not exhaustive, but is illustrative of some types of sensors that can be located on the HMD. The HMD may also house virtual environment (VE) Subsystems, such as cameras and sensors.

The HMD can include micro-displays, corrective lenses or mirrors with collimators, head and eye tracking with eye tracking cameras and IR lights to illuminate the eye for eye gaze tracking for augmenting visual displays; hand and arm tracking for haptic interfaces to control virtual objects and aid in the diagnostic tools; body tracking for locomotion and visual displays; and/or environment mapping interfaces sensor array to build a digitized geometrical model for interaction with sensors, diagnostics, and simulations.

Positional tracking sensors can include Wi-Fi location systems, Bluetooth location systems, mobile locations systems, and RFID location-based systems), and sound sensors.

Generally, the 6- to 9-degree of freedom sensors include an inertial measurement unit comprised of any number of accelerometers, gyroscopic sensors, and magnetometers.

Other sensor technologies which may be housed on the HMD are the digital buttons, which may include the power buttons, and a D-Pad or control-pad for accessing and controlling functions by the user, which may or may not be in a dongle; and if not in a dongle then it may exist on the headset or in a wired or wireless remote control. The sensors listed above may include their operating systems and output.

Other sensor technologies that may be housed on the HMD include digital buttons, which may include the power buttons, and a thumb-operated D-Pad or other control-pad for accessing and controlling functions by the user. The D-Pad may or may not be in a dongle; if not in a dongle, then it may exist on a headset or in a wired or wireless remote control. The sensors listed above may include their operating systems and output.

In another embodiment, the HMD may contain a front facing sensor array along with other sensors and optical character recognition (OTC) sensors and/or cameras 801 to read and/or measure information from the real-world visible field.

Power Connection

HMD 100 may also house connectors such as power connection for recharging a battery or for direct connection to an AC source. Additionally, the HMD may contain one or more connectors to connect via wire to the outside world for power and data (i.e. USB, HDMI, MiniUSB).

HMD 100 may also include other connectors for HDMI, sound, and other input/outputs, such as additional image overlay display, or for a diagnostics protocol for upgrading the system. The HMD may also house the microprocessor(s) control circuits (MCC). The HMD may also contain one or more ancillary display per eye, which can be projectors, like Pico projectors, or micro-displays. The displays may be used to project though either catoptric system, a dioptric system, or catadioptric system to create an ultra-short-throw image onto reflective lenses, which can be clear plastic, like a polycarbonate resin thermoplastic (Lexan).

Alternatively, some parts of the system mentioned herein may be in a dongle attached to the HMD via wire or wireless connection. Alternatively, some portions of the system mentioned herein may be contained in a connected device, such as a laptop, smart phone, or Wi-Fi router. Alternatively, some parts of the system mentioned herein may be contained in a smartphone or may be transferred back and forth from a smartphone to the HMD, when synced, such as the HMD displaying the smartphone apps and other features of the smartphone that would otherwise be displayed on the smartphone display. Alternatively, the HMD may contain and display various smartphone features.

In another aspect of the invention, the HMD may contain all the features of a typical smartphone and no connection may be needed with a smartphone to have all the smartphone features, like web or cell calling, app use, SMS, MMS, or similar texting, emailing, logging on to the internet, and the like.

In another aspect of this invention, the HMD headset may provide a computer mediated video shown on the reflective lens layer such that the wearer may see both the real world and the augmented video at the same time. In this aspect of the invention, such features as voice/speech recognition, gesture recognition, obstacle avoidance, an accelerometer, a magnetometer, gyroscope, GPS, special mapping (as used in simultaneous localization and mapping (SLAM)), cellular radio frequencies, Wi-Fi frequencies, Bluetooth and Bluetooth Light connections, infrared cameras, and other light, sound, movement, and temperature sensors may be employed, as well as infrared lighting and eye-tracking.

Simultaneous Localization and Mapping (SLAM)

The HMD headset may provide a computer mediated video rendered as a virtual image, so that the viewer sees both the object scene content and the generated virtual image content at the same time. According to an embodiment, such features as voice/speech recognition, gesture recognition, obstacle avoidance, an accelerometer, a magnetometer, gyroscope, GPS, special mapping (as used in simultaneous localization and mapping (SLAM)), cellular radio frequencies, Wi-Fi frequencies, Bluetooth and Bluetooth Light connections, infrared cameras, and other light, sound, movement, and temperature sensors may be employed, as well as infrared lighting, eye-tracking, and enhanced rendering of the generated virtual images.

Considerations for Enhancing AR/VR Content

For normal vision, optical elements in the eye focus an image onto the retina of the eye, using the lens, initiating a series of chemical and electrical events within the retina. Nerve fibers within the retina receive these signals and send electrical signals to the brain, which may then interpret these signals as visual images.

Thus, shading the AR/VR image may make the augmented reality (AR/VR) image more perceptible than the background object scene, and thus that image may be superimposed upon the retina and can exceed the RR version of the viewer.

It can be recognized that in many instances, the area of an AR/VR projected image may not be expressed in a standard geometrical form, such as oval, rectangular, or circular. Instead, algorithms are provided that continually and instantly measure and determine relative x,y grid positions for energizing pixels in the FOV to compensate for background brightness relative to the generated virtual image. Thus, real-time measurements may be taken from the area of the streaming AR/VR projected image, either with or without scotoma marker buffering, in order to determine which x,y grid pixels to activate, either up, down, to the left or right sideways, or transversely, such as up and left or down and right, to match more or less that of the original image pixels being generated from the HMD system. Thus, two pixels or parts of an image which were originally exactly adjacent to one another on any axis up/down, sideways, or transverse, may be activated together one way, or, if one pixel or part of an image is closer to one border than to the other, the pixels are to be split with one pixel or image going to its closest border and the other pixel going to its respective closest border, which may be the essence of corrective subpixel mapping and modification.

Adjustable Focus

As the most useful default for most virtual image viewability, HMD optics are typically designed to form the virtual image so that it appears to be at optical infinity, that is, with rays substantially in parallel to the optical axis. In an embodiment, the HMD optics are designed to provide the augmented virtual image at about 1 m distance from the viewer eyebox, equivalent to approximately 1 diopter prescription glasses.

Figure 10A:
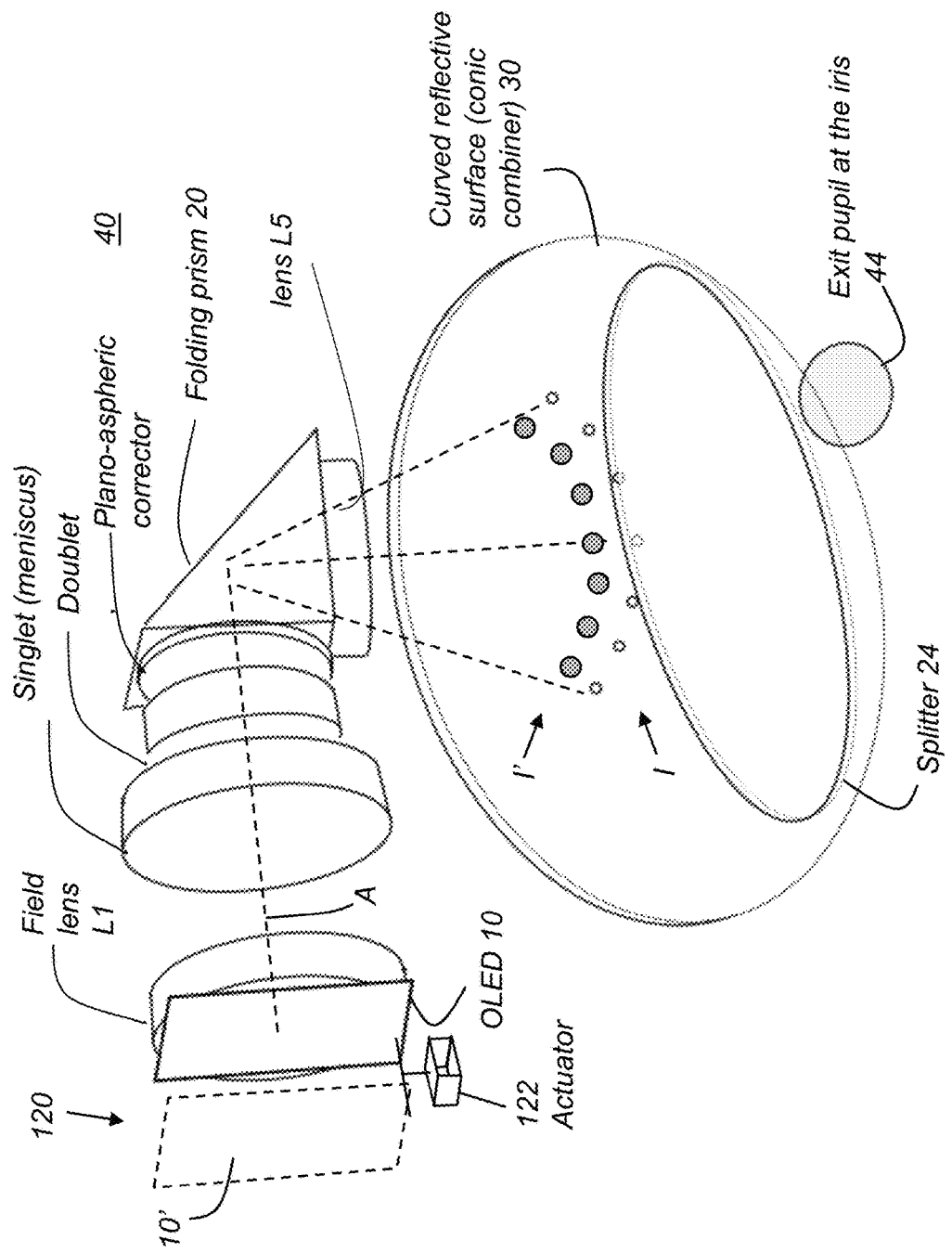
FIG. 10A is a schematic diagram showing optical relay components used for focal plane adjustment.

In some applications, closer focal length is advantageous. The focal length that is most suitable for presenting the generated image can be determined using gaze tracking to determine the direction of viewer vision, which can be used to calculate the spatial intersection of respective visual axes for left and right eyes, for example. To achieve suitable focus for the generated image content, the Applicant's solution provides measurement and adjustment for diopter of the optical relay 40 optics. Referring to FIG. 10A, there is shown a schematic for relay 40 components that includes an actuator 122 and associated components as part of a focal plane adjustment system 120. By changing image generator 10 position along an axis A, a change in focal position is effected, such as with image generator display 10 shifted to the dashed outline position denoted for display 10' in FIG. 10A (with image generator 10 translation shown in exaggerated form). This movement causes a corresponding shift of intermediate image I to the position shown as image I' in relay 40. The splitter 24 and combiner, curved mirror 30, then condition the image-bearing light to provide a virtual image at a shifted spatial location. Actuator 122 can be a linear piezoelectric actuator, for example, capable of high-speed change between positions along axis A. One or more actuators 122 can be used for moving any of the components described hereinabove with relation to optical relay 40 in order to adjust the position of the focal plane.

Figure 10B:
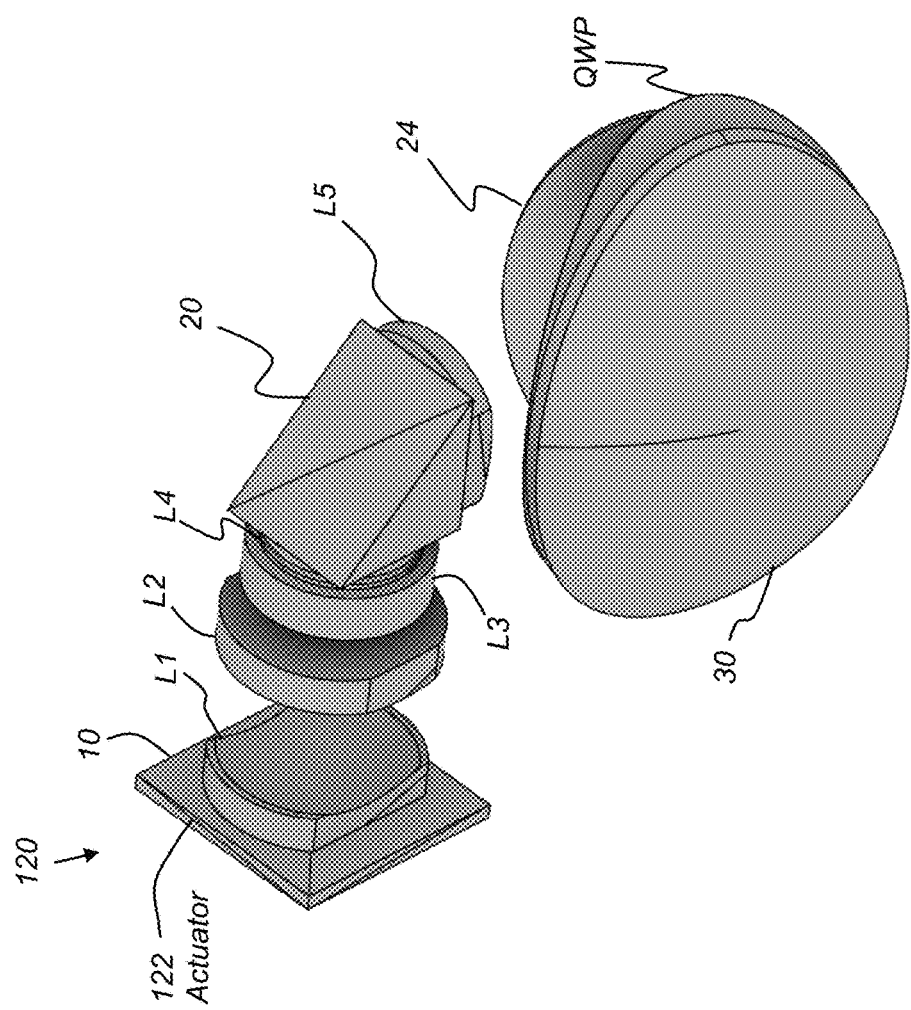
FIG. 10B is a perspective view that shows position of an actuator relative to the display and to corresponding optics for focal plane adjustment.

FIGS. 10A, 10B, 10C, and 10D show different views of relay optics with focal plane adjustment system 120. FIG. 10B is a perspective view that shows position of actuator 122 relative to image generator 10 and corresponding optics.

Figure 10C:
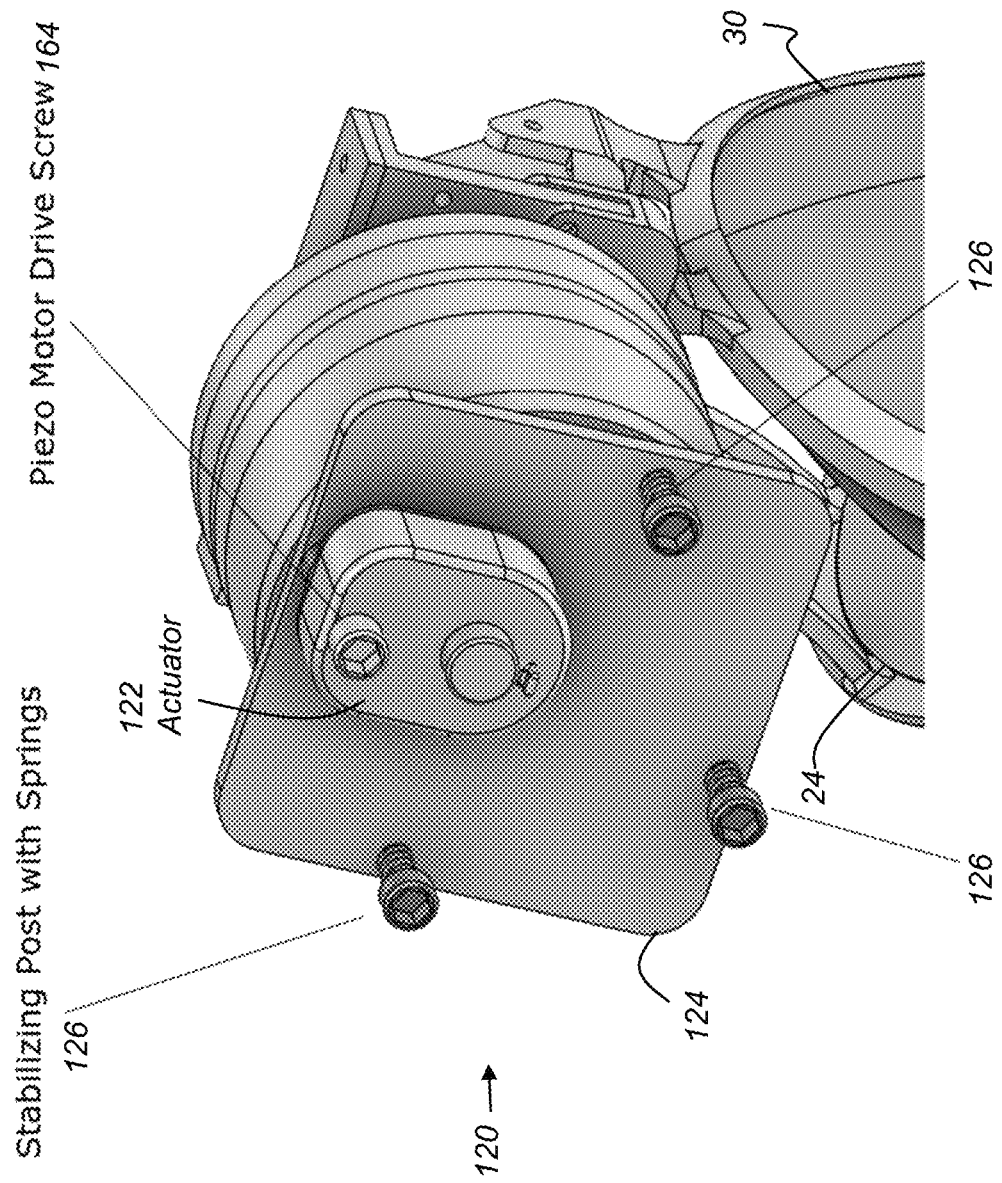
FIG. 10C is a perspective view from behind the display component, showing a piezoelectric actuator mounted to a plate behind the display.
Figure 10D:
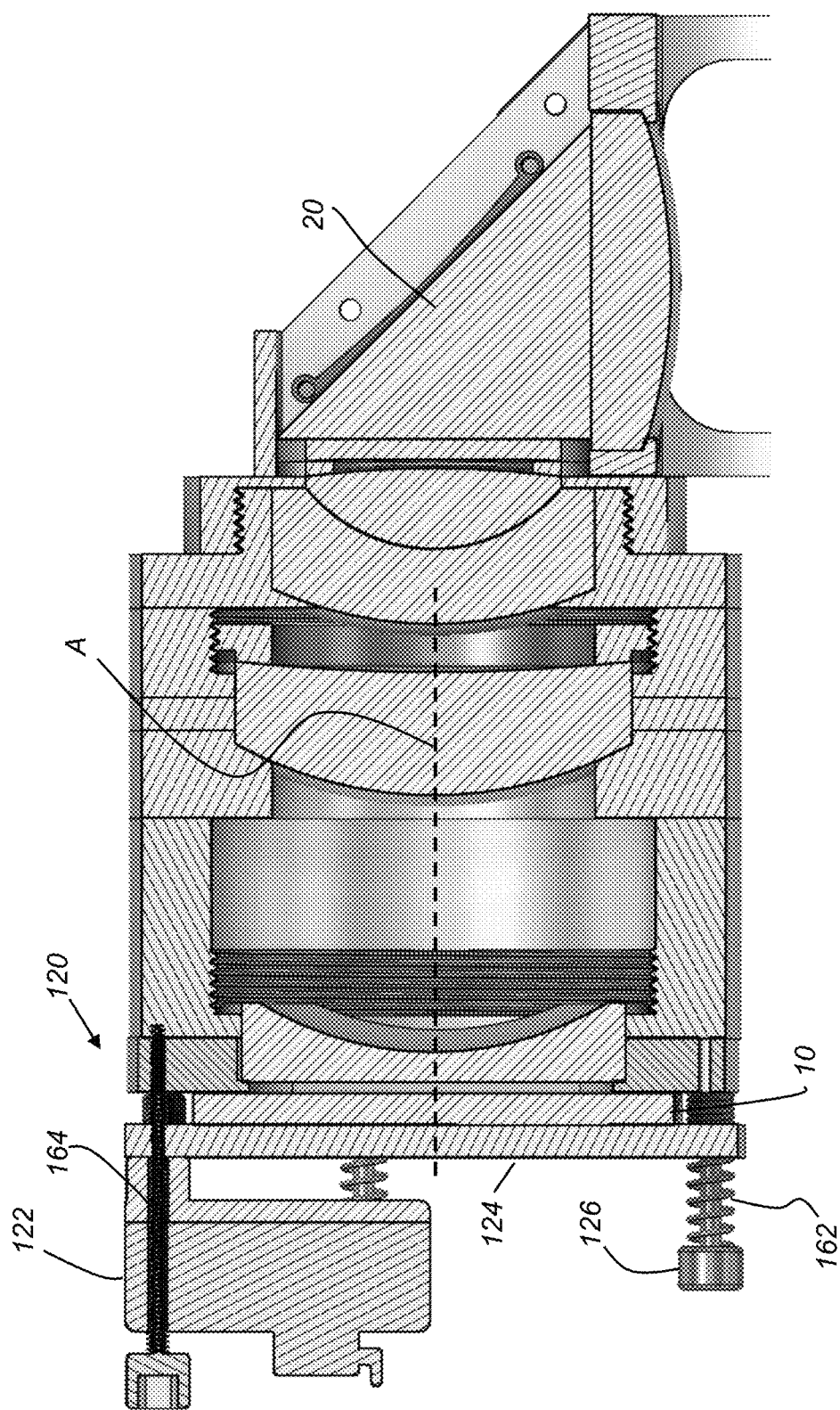
FIG. 10D is a side view showing components of a dynamic focus adjustment apparatus.

FIG. 10C is a perspective view from behind image generator 10, showing a piezoelectric actuator 122 mounted to a stationary plate 124 behind image generator 10 (not visible in the view of FIG. 10C). Actuator 122, such as a piezoelectric actuator, FIG. 10D shows a side view of adjustment system 120 components. One or more stabilizing posts 126 has a screw and a compression spring 162 for maintaining image generator 10 in position along the optical path, so that movement of image generator 10 is constrained to the axial direction (axis A) during actuation.

Focal plane adjustment can be useful, for example, to provide image data suitable for a light-field display. Light field display content provides an added dimension of directional information that characterizes the geometric distribution of the light and provides improved directional resolution and depth information for the recorded image content; parallax light-field display is particularly advantageous for rendering virtual images from the combined left-eye and right-eye image content as perceptible for forming 3D images and/or 3D video.

Dithering

According to an embodiment of the present disclosure, dithering can be employed to modify and improve the visual experience of the viewer. Dithering can be effected, for example, by rapid in-plane vibration of image generator 10 using a piezoelectric actuator 122, as was described previously with respect to FIGS. 10A-D. Dithering, imparted to the displayed image content using synchronous, timed spatial displacement, can be a desirable solution for helping to mask or eliminate display-related artifacts, for example.

Dithering can also be used to enhance image resolution. Improved image resolution is a goal, and holds promise for future use of AR/VR glasses in various applications, such as in critical use cases such as surgery visualization. In these applications, for example, detail visualization of fine layers and blood vessels can be critical to successful outcomes. Micro-displays continue to mature, with pixel counts of 2 million in a single small device, with further improvements likely. These higher resolution displays impose steeply increased demands on system resources, including higher power and computation speed and complexity, for example.

The Applicant addresses this problem using dithering of display components. This solution can make higher resolution images available to users at a discounted power cost, which in turn can provide lighter, cooler running systems.

Increased pixel resolution is obtained by using the capability to shift image generator 10 in-plane, that is, in one or more directions parallel to the emissive display surface of image generator 10, synchronously with corresponding changes in image data content. With respect to FIG. 10D, image generator 10 translation is orthogonal to axis A for dithering to increase pixel resolution using synchronous, timed spatial displacement. Actuator 122 is configured to provide dithering using in-plane translation of image generator 10.

Figure 11:
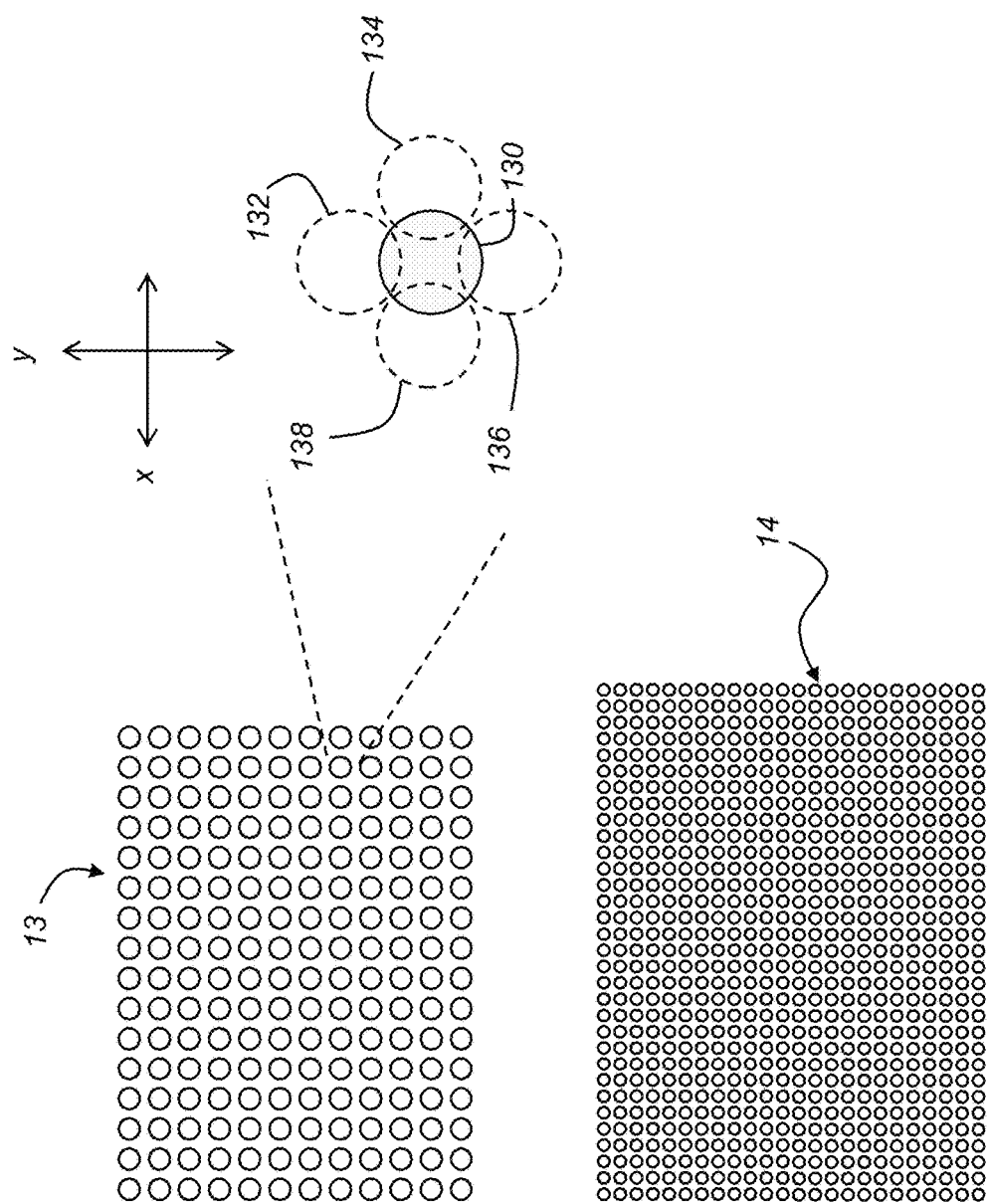
FIG. 11 is a schematic diagram showing aspects of dithering.

As shown schematically in FIG. 11, multiplying the image generator 10 resolution can be effected by physically shifting an array 13 of pixels that form image generator display 10, with the shift in the x-y plane. The shift distance is a fraction of the pixel pitch. At right in FIG. 11 is represented a single pixel 130 of array 13, shifted in the x-direction to pixel positions 134 and 138 and shifted in the y-direction to positions 132 and 136. Synchronous with the shift action is modulation of image data for each pixel 130 at its original position and at each shifted position 132, 134, 136, and 138. Thus, for example, the state of a pixel at its position 134 can differ from its state at position 138, according to the image data content that is provided with the shift. With a half-pixel shift in each x- and y-direction, for example, the effective pixel count can be increased by at least 4 times. With a half-pixel shift only along one axis, such as only along the x or y axis as shown, the effective resolution along the axis parallel to the shift can be double. Overall, the power cost of nano scale piezo shifting is much lower than the cost to design and implement 4x the pixel count using a higher resolution image generator 10 element. An array 14 represents increased pixel resolution.

For the embodiment of FIG. 11, an image generator 10 was provided, having a 240 frames per second (fps) refresh rate. In terms of the piezoelectric actuation provided, each pixel element can be relocated at ½ the delta of the pixel element center-to-center distance in the array 13. This arrangement can provide 60 fps display and 4x the resolution of the original image generator 10.

By way of example, an embodiment of the present disclosure employs QNP-XY Series Two-Axis, CY Piezo Nanopositioners for image generator 10 dithering actuation.

A number of features allow piezoelectric dithering to provide enhanced resolution, including the following:

(1) Adjustable travel range, such as from 100 um to 600 um, for example;
(2) Long device lifetimes;
(3) Superior positioning resolution; and
(4) High stiffness and other factors.

A number of piezoelectric actuators provide the option of closed-loop feedback that allows sub-nanometer resolution and high linearity.

Compensation for Macular Degeneration

For advanced macular degeneration (AMD) and other eye disease patients, the cutting of the "hole" and repositioning of the streaming video or image may be accomplished primarily by stretching the pixels to a larger overall area than the original captured image (i.e., 100° stretches to 120° overall space, but the center 10° may be cut out and then the edge image compressed, such that the final image is still 100°).

As is noted, the outer edges of the virtual image, as it reaches the FOV boundary, may be compressed so that the final image does not exceed the surface display area of the original image being projected. In this method, all the pixels are retained, in relatively the same size and shape, as originally captured and buffered by the camera(s), except that the far edge boundary has either been extended or compressed.

Likewise, HMD components may use the same "hole," "buffer," or "mapped scotoma" area to display the image being manipulated as well as shading the "hole" or "scotoma marker" which is removed. This method may use buffering of the image and pixel mapping, interpolation, and synthesis to achieve both the buffered image (that may be created using a self-calibration mode, that may edge-detect and map the analog defect in the eye and position it according to how the digital HMD is worn to create the desired effect). Following this method, the pixels in the area of the display to be avoided may be mapped, in real or near real time, within or without a buffer, and software algorithms may keep the same shape of the image, but reduce the size of the pixels to address where both the RR modified image, as well as the compensating pixels, are to be displayed.

In the instance of a compensating region of less than 1:1 pixels on the original image, an image which was, for instance, represented as shown on four pixels may be shown on three, two, or just one pixel. The resulting display may represent the full image using fewer pixels and subpixels. Pixels as used herein are perceived spaces where subpixel mapping is a recently developed technology involving algorithms to obtain and map the spatial distribution information of area covered within mixed pixels and then reposition them on a smaller or different scale. Algorithms can be applied to pixel mapped video or image content and moved images from one location in the video to another and the shape to be avoided may have edges and otherwise not be a homogenous shape like a circle or oval. In some instances, the pixels or subpixels must be "distorted" in order to have more than 100% of the image included into 100% of the display space. In this case, the pixels or image may take on a shape which is not a typical pixel square, but can be something besides a square, and often more like a tetrahedron or polyhedron, or shapes like triangles or parallelograms.

Under this method, the classification on a per pixel basis may be established and then reconstituted in a pixel/subpixel format to achieve subpixel mapping for modification, which may be recognized by the buffering to display software and also by the HMD software. By applying known pixel and subpixel mapping techniques, as well as those noted herein, an image or video can be displayed with augmented pixel/subpixel manipulation and stitching so that a complete image is rendered at a specified position within the FOV, which may be other than that acquired by a camera.

Embodiments of the present disclosure can include a method to store a pattern for brightness compensation, as well as to project it on a display. A mapping for this purpose can enhance the diagnostic impairment mapping (DIM) or self-calibration system and include a method to capture information about the area and location of the eye containing a defect, as in mapping the area where macular degeneration has occurred and little or no sight or vision remains. Using various gradients during visual field testing of a macular degeneration patient, the model controller can randomly select, or be programmed, to give the patient different amounts of light, gradient, or obfuscation so that it is possible to more accurately distinguish areas of relative scotoma from the areas of an absolute scotoma.

Shaders, used widely in cinema postprocessing, computer-generated imagery, and video games to produce a seemingly infinite range of effects, can be used in creating both the augmented reality image and the compensating opaque pattern that it mirrors, primarily where monochrome (opaque, dark, or diffuse/non-diffuse). Beyond just simple lighting models, more complex uses include altering the hue, saturation, brightness, or contrast of an image, producing blur, light bloom, volumetric lighting, normal mapping for depth effects, bokeh, cel shading, posterization, bump mapping, distortion, chroma keying (so-called "bluescreen/greenscreen" effects), as well as diffusion/non-diffusion, edge detection and motion detection, psychedelic effects, and a wide range of other effects.

According to another aspect of the present disclosure, the model controller may establish a plurality of x, y maps that vary in any of the parameters mentioned herein and may be used to generate the streaming pixeling for HMD compensation.

Each eye of the patient may be different and may have a unique defect. For instance, one eye of the patient may have a specific defect (having a specific shape, size, and location), while the other eye of the patient may not have a defect or may have a defect having a different shape and size. Thus, each eye of the patient may be individually mapped and a respective visual model of each eye may be established. Likewise, a border of the defect of each eye may be generated and an associated map generated. In one embodiment, separate cameras may generate a separate set of images for each eye and the display controller may generate a respective series of images to be presented to each eye and a corresponding compensation pattern.

The boundary of a patterned area may be established as a function of the values associated with the cells in the x, y grid. In one embodiment, the values in the grid may be compared with a threshold in the original AR/VR image projection to establish the boundary. Alternatively, the FOV data may be used to create a contour. The visual model may emerge from interpreting the raw data and may not necessarily be a point-by-point transformation of the raw data. The intent may be to put the removed pixels as close to where they ordinarily would have been, and thus the algorithms in the software may determine, based on (i) the whole of the defect, (ii) the distance of the specific pixel or ray from the border of the defect, (iii) whether a pixel is a new image or a part of an existing image (meaning whether the pixel is a part of an image or on the border of an image change), (iv) the other options for the pixel to move another way, and (v) where the adjacent pixels to be adjusted are being moved and exactly where to move such pixels/rays.

According to an alternate embodiment, vector images may be used to generate the compensating pattern image with pixels. For the purpose of this disclosure, vector images and pixels are used interchangeably. However, in practice, unlike digital images which are typically formed of millions of tiny squares or other shapes known as pixels, vector images are defined from mathematical points connected together by lines and curves to form different shapes. Since they are based on math and algorithms, not merely on pre-placed pixels, vector shapes are extremely flexible and scalable, not suffering from some of the limitations of pixels.

Tracking systems like RFID, Wi-Fi, or cellular tracking location based directional travel can control the brightness compensation pattern by, for instance, turning on pattern operation when the wearer exits a building.

Other communication systems can also be included based on either wire or wireless connectivity of the HMD. The HMD can also be connected wired or wirelessly to a main monitoring data system which would track the health, whereabouts, and condition of the user to be reported to another party, such as a caretaker or a health care provider.

One aspect of the disclosed brightness compensation pattern can solve the typical "heads-up" reflected display problem of visualization in bright light or sunlight conditions. In this instance, the HMD may use a bright display, such as, for the highest resolution, a Quad HD AMOLED display, which may be used to provide virtual image content. In using a high-NIT and high-resolution AMOLED reflected display, the brightness may be adjusted up or down depending on ambient light. Alternatively, the adjustment may be in the system controller and automatically adjust depending on what the sensors say the brightness of the ambient light is, which would typically be brighter when in brighter exterior light.

The brightness compensation pattern layer may exist in one or more layers to gain added effect; for instance, one brightness compensation pattern layer might provide shading with an opaqueness or darkness, while at the same time a mirror image of that layer, or some non-mirror image of that layer, might turn on color pixels to create a bold effect.

The HMD may include an eye-tracking subsystem, which may work through hardware and software. The software may be connected to the system's GPU working in connection with the system's model controller. The eye-tracking may be captured by infrared (IR) light being projected onto the eye, which may create a glint or reflection, which may then be captured by an IR sensitive camera. Typically, an eye-tracking system captures the glint from the eye from 30 frames per second to 500 frames per second. This information may be stored in real-time in the model controller, which can be an MVC, and then may process this information into a virtual space represented by x, y or Cartesian coordinates. These coordinates may provide the system with the information about where the user's gaze is in relation to the reflective lens and the brightness compensation pattern so that both stay aligned with the user's gaze.

When used for medical applications, like advanced macular degeneration (AMD), the eye-tracking information may be correlated with the buffered information about the person's eye visual defect such that when the manipulated image is displayed and the brightness compensation pattern is used with that manipulated image, both layers (AR/VR reflected layer and the brightness compensation pattern) are in sync with the user's gaze and the dynamic opacity brightness compensation pattern is opaque over the manipulated area so that the virtual image is more visible to the user than the object scene. This may be necessary because eye scanning and eye movement may necessitate that the buffered and manipulated area of the video be moved to correspond to the user's eye gaze so that the buffered "hole" in the original image (AR/VR) and the brightness compensation pattern image obscuring the object scene behind the "hole" and the user's defect align and remain in sync. All this processing may happen in real-time and may keep up with the movement of the user's eye. Latency may be important and keeping the latency to less than 10 to 20 milliseconds may aid in preventing the user from feeling dizzy and preventing whirr.

According to an aspect of the present disclosure, the HMD may provide an either an AR experience such as geolocation gaming, or a favorite VR immersive experience, as the brightness compensation pattern can change the lens from see-through to obscured and/or opaque with a simple virtual touch or voice command or hand gesture. Alternately, the brightness compensation pattern pixels/dexels may be activated by the use of an Automatic Light-Adaptive Scaler™ (ALAS™) so that, for instance, the display may change to block sunlight and to deepen a gamer's experience.

According to an aspect of the present disclosure, multiple display panels (image generators 10) may be placed for each eye, using a catoptric, dioptric, or catadioptric system to combine into a larger effective image.

According to an aspect of the present disclosure, spatial light modulator 52 can be configured to form a parallax light-field display, rendering virtual images to appear as three-dimensional images.

In another embodiment, the system may arrange multiple display panels and their associated catoptric or catadioptric systems radially around the eyeball, rather than "in front of" the eyeball, making it easier for the image to cover a wide field of view in the far-left periphery and far right periphery of each eye.

In one embodiment, the optics may make multiple display panels appear to the eye to be optically overlapping, so even when normal mechanical tolerances during assembly place each display panel slightly left or right of the nominal position, software similar to standard "multi-projector display" "projection mapping" "video mapping" remapping software may find out exactly how much they actually overlap on each individual headset and re-align the image in software to create one large effective display per eye.

In one embodiment, the region of the overall effective virtual display generated by each physical display may have a constant resolution, which is to say the resolution of the virtual display may be a 1:1 enlargement of the combination of the individual physical displays.

In one embodiment, the catoptric, dioptric, or catadioptric system may be designed such that the region of the overall effective virtual display generated by the physical display may have variable resolution, with higher resolution in the region near the center of vision, and lower resolution in the periphery, which is to say that the virtual display may have a higher density of the pixels from the combined physical displays in the HAR, and a lower density of pixels from the combined physical displays toward the outer bounds of the virtual display.

In one embodiment, the variable resolution may be linear. In this embodiment, the distribution of the physical pixels to the virtual display may be dissipated in a more or less linear fashion after the High Acuity Region (HAR) is established, such as the linear function f(x)=mx+b where m is not equal to 0.

In one embodiment, the variable resolution may not be linear. In this embodiment, the distribution of the physical pixels to the virtual display may be dissipated in a non-linear fashion after the HAR region is established, such as according to a cubic Bezier curve.

In one embodiment, the catoptric, dioptric, or catadioptric system may be manufactured as a single unit. This manufacturing process can make alignment easier to achieve.

In one embodiment, the catadioptric, dioptric, or catadioptric system may be manufactured in several sections. This manufacturing process can provide the ability to utilize more complex design for the overall HMD. While not necessarily reducing cost, a multiple unit production could lend itself to more ergonomic HMD designs.

Whereas, the devices and methods have been described in relation to the drawings and claims, it should be understood that other and further modifications, apart from those shown or suggested herein, may be made within the spirit and scope of this invention.

The invention has been described in detail with particular reference to a presently preferred embodiment, but it will be understood that variations and modifications can be effected within the spirit and scope of the disclosure. The presently disclosed embodiments are therefore considered in all respects to be illustrative and not restrictive. The scope of the invention is indicated by any appended claims, and all changes that come within the meaning and range of equivalents thereof are intended to be embraced therein.

The invention claimed is:

1. A wearable display apparatus comprising:
   (a) an image generator that is energizable to form a generated 2D image;
   (b) a partially transmissive mirror having a curved reflective surface;
   (c) a beam splitter disposed to reflect light toward the curved reflective surface;
   (d) an optical image relay that is configured to relay the formed 2D image at the image generator to a curved focal surface of the partially transmissive mirror,
   wherein the curved focal surface is defined between the curved reflective surface of the partially transmissive mirror and the beam splitter,
   wherein the optical image relay comprises a prism having a plano-aspheric lens in optical contact against a prism input surface and configured to guide image-bearing light from the image generator toward a folding surface of the prism and to form an aperture stop within the prism,
   wherein the relay, the partially transmissive mirror, and beam splitter provide a near-eye catadioptric pupil-forming imaging system configured to form an exit pupil for viewing the generated 2D image as an optical virtual image superimposed against an object scene; and
   (e) a spatial light modulator disposed between the partially transmissive mirror and the object scene and configured with an addressable array of pixels for selectively changing opacity for visible light from the object scene.

2. The apparatus of claim 1 wherein the spatial light modulator forms a parallax light-field display rendering the optical virtual image perceptible as a three-dimensional image.

3. The apparatus of claim 1 wherein the spatial light modulator is formed from layers deposited on the partially transmissive mirror.

4. The apparatus of claim 1 wherein the spatial light modulator is spaced apart from the curved mirror.

5. The apparatus of claim 1 wherein spatial light modulator opacity to visible light from the object field can be changed according to a sensed signal from a viewer instruction entry.

6. The apparatus of claim 1 wherein the command is acquired as an audible command.

7. The apparatus of claim 1 wherein the command is acquired by hand gesture recognition.

8. The apparatus of claim 1 wherein the command is manually entered by the viewer.

9. The apparatus of claim 1 wherein the selectively changed opacity is provided by diffusion.

10. The apparatus of claim 1 wherein the command is acquired according to a change in head tilt.

11. A method comprising:
   a) energizing an electroluminescent image generator to emit light forming a generated 2D image;
   b) relaying the image generator to a curved surface at a focal plane of a partially transmissive curved mirror, wherein relaying further comprises directing an image-bearing light from the image generator to a prism having a plano-aspheric lens in optical contact against a prism input surface, wherein the plano-aspheric lens is configured to guide image-bearing light from the image generator toward a folding surface of the prism and to form an aperture stop within the prism, wherein the curved surface at the focal plane is conjugate to the image generator and wherein the focal plane of the partially transmissive curved mirror is formed using a beam splitter that is disposed to reflect light toward the partially transmissive curved mirror surface, wherein the relay, the partially transmissive curved mirror surface, and beam splitter are configured to form an exit pupil for viewing the generated 2D image as an optical virtual image superimposed on an object field;
   c) obtaining image content from the object field through a spatial light modulator that is disposed between the partially transmissive curved mirror and the object field and is configured with addressable array of pixels for selectively changing opacity for visible light from the object field;
   and
   d) energizing the spatial light modulator and modulating opacity over the object field according to command entry by a viewer,
   wherein the spatial light modulator forms a parallax light-field display rendering the optical virtual images viewable as three-dimensional images.

12. The method of claim 11 further comprising tracking eye gaze of a viewer and changing a focal length for the optical virtual image according to eye gaze tracking.

13. The apparatus of claim 11 wherein the command entry is an audible command.

14. The apparatus of claim 11 wherein the command entry is a hand gesture.

15. The apparatus of claim 11 wherein the command entry is manually entered by the viewer.

16. The apparatus of claim 11 wherein the selectively changed opacity is provided by diffusion.

17. The apparatus of claim 11 wherein the command entry relates to a change in head tilt.

18. A wearable display apparatus comprising:
   (a) an image generator that is energizable to form a generated 2D image;
   (b) a partially transmissive mirror having a curved reflective surface;
   (c) a polarization beam splitter disposed to reflect light toward the curved reflective surface;
   (d) an optical image relay that is configured to relay the generated 2D image at the image generator to a curved focal surface of the partially transmissive mirror,
   wherein the relay comprises a prism having a plano-aspheric lens in optical contact against a prism input surface and configured to guide image-bearing light from the image generator toward a folding surface of the prism and to form an aperture stop within the prism,
   wherein the curved focal surface is defined between the curved reflective surface of the partially transmissive mirror and the polarization beam splitter,
   wherein the relay, curved mirror, and polarization beam splitter are configured to form an exit pupil for viewing the generated 2D image as an optical virtual image superimposed against an object field;
   and
   (e) a sensor configured to generate a sensor signal in response to an audible command, head position, or hand gesture instruction entered by a viewer,
   wherein a surface of the curved mirror is conditioned with one or more addressable areas for selective control of opacity for visible light from the object field, according to the sensor signal.

19. A wearable display apparatus for a viewer,
   the apparatus having: a left-eye imaging section and a right-eye imaging section, wherein each imaging section comprises:
   (a) an image generator that is energizable to form a generated 2D image;
   (b) a partially transmissive mirror having a curved reflective surface;
   (c) a beam splitter disposed to reflect light toward the curved reflective surface;
   (d) an optical image relay that is configured to relay the generated 2D image at the image generator to a curved focal surface of the partially transmissive mirror,
   wherein the curved focal surface is defined between the curved reflective surface of the partially transmissive mirror and the beam splitter,
   wherein the relay comprises a prism having a plano-aspheric lens in optical contact against a prism input surface and configured to guide image-bearing light from the image generator toward a folding surface of the prism and to form an aperture stop within the prism,
   wherein the optical image relay, partially transmissive mirror, and beam splitter are configured to form an exit pupil for viewing the generated 2D image as an optical virtual image superimposed against an object field;
   (e) a spatial light modulator disposed between the partially transmissive mirror and the object field and configured with an addressable array of pixels for selectively changing opacity for visible light from the object field;
   (f) an eye-gaze detection apparatus that is configured to identify at least a direction of vision of the viewer; and
   (g) a focal length control apparatus that is configured to determine a focal length according to the identified direction of viewer vision and to adjust the focal length for forming the optical virtual image, wherein the selectively changed opacity alternates between the spatial light modulator for the left-eye imaging section and the spatial light modulator for the right-eye imaging section.

20. The apparatus of claim 19 wherein the focal length control apparatus comprises a piezoelectric actuator.

21. The apparatus of claim 19 wherein the spatial light modulator is a liquid crystal device.

22. The apparatus of claim 19 wherein the combined image content from left- and right-eye imaging sections forms three-dimensional images or video.

* * * * *